United States Patent
Baron et al.

(10) Patent No.: US 12,472,229 B2
(45) Date of Patent: Nov. 18, 2025

(54) HYALURONIC ACID STABILIZER

(71) Applicant: Rheinisch-Westfälische Technische Hochschule (RWTH) Aachen, Aachen (DE)

(72) Inventors: Jens Malte Baron, Aachen (DE); Sebastian Huth, Aachen (DE)

(73) Assignee: Rheinisch-Westfälische Technische Hochschule (RWTH), Aachen (DE)

( * ) Notice: Subject to any disclaimer, the term of this patent is extended or adjusted under 35 U.S.C. 154(b) by 658 days.

(21) Appl. No.: 17/281,009

(22) PCT Filed: Sep. 27, 2019

(86) PCT No.: PCT/EP2019/076289
§ 371 (c)(1),
(2) Date: Mar. 29, 2021

(87) PCT Pub. No.: WO2020/065056
PCT Pub. Date: Apr. 2, 2020

(65) Prior Publication Data
US 2022/0118048 A1    Apr. 21, 2022

(30) Foreign Application Priority Data
Sep. 28, 2018  (DE) .......................... 102018124022.8

(51) Int. Cl.
*A61K 38/17*  (2006.01)
*A61K 9/00*  (2006.01)
*A61P 17/02*  (2006.01)
*A61P 19/02*  (2006.01)

(52) U.S. Cl.
CPC ........ *A61K 38/1709* (2013.01); *A61K 9/0014* (2013.01); *A61P 17/02* (2018.01); *A61P 19/02* (2018.01)

(58) Field of Classification Search
None
See application file for complete search history.

(56) References Cited

U.S. PATENT DOCUMENTS

| | | |
|---|---|---|
| 2014/0004210 A1 | 1/2014 | Iino et al. |
| 2015/0038778 A1 | 2/2015 | Guerrier et al. |

FOREIGN PATENT DOCUMENTS

| | | | |
|---|---|---|---|
| EP | 3 042 666 A1 | 7/2016 | |
| WO | WO-9957140 A2 * | 11/1999 | ........... C07K 14/811 |
| WO | WO 2003/043660 A2 | 5/2003 | |
| WO | WO 2005/110439 A2 | 11/2005 | |
| WO | WO-2011110894 A2 * | 9/2011 | ............. A61K 8/345 |
| WO | WO-2013135836 A1 * | 9/2013 | ........... C12Q 1/6883 |
| WO | WO 2014/023272 A1 | 2/2014 | |
| WO | WO 2017/027177 A1 | 2/2017 | |
| WO | WO 2018/118448 A1 | 6/2018 | |

OTHER PUBLICATIONS

Barker, H., et al., "Role of carbonic anhydrases in skin wound healing," Experimental & Molecular Medicine (2017) 49, e334.
Bost, F., et al., Inter-α-trypsin inhibitor proteoglycan family A group of proteins binding and stabilizing the extracelular matrix, Eur. J. Biochem. (1998) 252, 339-346.
Camp, R.L., et al., "CD44 Is Necessary for Optimal Contact Allergic Responses but Is Not Required for Normal Leukocyte Extravasation," J Exp Med (1993) 178, 497-507.
Chen, et al., "Conformational Differences in Human Apoprotein B-100 among Subspecies of Low Density Lipoproteins (LDL)," J Biol Chem (1994) 269, 29121-29128.
Clark H.F., et al., "The Secreted Protein Discovery Initiative (SPDI), a Large-Scale Effort to Identify Novel Human Secreted and Transmembrane Proteins: A Bioinformatics Assessment," Gnome Res. (2003) 13, 10, 2265-2270.
Day, A.J., et al., "Hyaluronan cross-linking: a protective mechanism in inflammation?" Trends Immunol. (2005) 26, 637-643.
Esser, P.R., et al., "Contact Sensitizers Induce Skin Inflammation via ROS Production and Hyaluronic Acid Degradation," PLoS One (2012) 7, e41340.
Fakhari A., et al., "Applications and Emerging Trends of Hyaluronic Acid Tissue Engineering, as a Dermal Filler, and in Osteoarthritis Treatment," Acta biomater. (2013) 9, 7, 7081-7092.
Gao et al., "Extracellular Superoxide Dismutase Inhibits Inflammation by Preventing Oxidative Fragmentation of Hyaluronan," J Biol Chem (2008) 283, 6058-6066.
Hædersdal, M., et al., "Fractional $CO_2$ Laser-Assisted Drug Delivery," Lasers in Surgery and Medicine (2010) 42, 113-122.
Himmelfarb, M., et al., "*ITIH5*, a novel member of the inter-α-trypsin inhibitor heavy chain family is downregulated in breast cancer," Cancer Lett. (2004) 204, 69-77.
Huth, S., et al., "Inter-α-trypsin inhibitor heavy chain 5 (ITIH5) is overexpressed in inflammatory skin diseases andaffects epidermal morphology in constitutive knockout mice and murine 3D skin models," Exp. Dermatol. (2015) 24, 9, 663-668.
Huth, S. et al., "Ablative non-sequential fractional ultrapulsed $CO_2$ laser pretreatment improves conventional photodynamic therapy with methyl aminolevulinate in a novel human in vitro 3D actinic keratosis skin model," Exp Dermatol. (2016) 25, 12, 997-999.
Huth, S., et al., "Inter-alpha-trypsin inhibitor heavy chain 5 (ITIH5) could be a novel key player in skin barrier formation," Journal of Investigative Dermatology (2016) 136, S56 (abstract only).
Jablonska-Trypuc, A., et al., "Matrix metalloproteinases (MMPs), the main extracellular matrix (ECM) enzymes in collagen degradation, as a target for anticancer drugs," Journal of Enzymes Inhibition and Medicinal Chemistry (2016) 31, 177-183.
Kähäri, V.M., et al., "Matrix metalloproteinases in skin," Exp Dermatol (1997) 6, 199-213.

(Continued)

*Primary Examiner* — Sergio Coffa
(74) *Attorney, Agent, or Firm* — BALLARD SPAHR LLP

(57) ABSTRACT

The mammalian protein ITIH5 is disclosed as a stabilizer of hyaluronic acid or a salt thereof. A composition containing the mammalian protein ITIH5 and water is furthermore provided.

14 Claims, 6 Drawing Sheets

(56) References Cited

OTHER PUBLICATIONS

Kavasi, R.M. et al., "HA metabolism in skin homeostasis and inflammatory disease," Food and Chemical Toxicology (2017) 101, 128-138.
Keen, M.A., "Hyaluronic Acid in Dermatology," Skinmed (2017) 15, 462-469.
Knudson, C.B., et al., "Hyaluronan-binding proteins in development, tissue homeostasis, and disease," FASEB J. (1993) 7, 1233-1241.
Lauer, M.E., et al., "Tumor Necrosis Factor-stimulated Gene-6 (TSG-6) Amplifies Hyaluronan Synthesis by Airway Smooth Muscle Cells," J Biol Chem (2013) 288, 423-431.
Martin, J, et al., Tumor Necrosis Factor-stimulated Gene 6 (TSG-6)-mediated Interactions with the Inter-α-inhibitor Heavy Chain 5 Facilitate Tumor Growth Factor β1 (TGF β1)-dependent Fibroblast to Myofibroblast Differentiation, J Biol Chem (2016) 291, 13789-13801.
Maytin, E.V., "Hyaluronan: More than just a wrinkle filler," Glycobiology (2016) 26, 553-559.
Muto, J., et al., "Hyaluronan digestion controls DC migration from the skin," J Clin Invest (2014) 124(3), 1309-1319.
Pohlig, F., et al., "Hyaluronic Acid Suppresses the Expression of Metalloproteinases in Osteoarthritic Cartilage Stimulated Simultaneously by Interleukin 1β and Mechanical Load," PLoS One (2016) 11, e0150020.
Salier, J.P., et al., "The inter-α-inhibitor family : from structure to regulation," Biochem. J. (1996) 315 (Pt 1), 1-9.
Sanggaard, K.W., et al., "The Transfer of Heavy Chains from Bikunin Proteins to Hyaluronan Requires Both TSG-6 and HC2," J Biol Chem (2008) 283, 18530-18537.
Shimizu, M., et al., "Hyaluronan Inhibits Matrix Metalloproteinase-1 Production by Rheumatoid Synovial Fibroblasts Stimulated by Proinflammatory Cytokines," J Rheumatol (2003) 30, 1164-1172.
Singh, A., et al., "Microneeding: Advances and widening horizons," Indian Dermatol Online J (2016) 7, 244-254.
Takahashi, K., et al., "The effects of hyaluronan on maxtrix metalloproteinase-3 (MMP-3) interleukin-1β (IL-1β), and tissue inhibitor of metalloproteinases-1 (TIMP-1) gene expression during the development of osteoarthritis," Osteoarthritis and Cartilage (1999) 7, 182-190.
Taylor, K.R. et al., "Recognition of Hyaluronan Releases in Sterile Injury Involves a Unique Receptor Complex Dependent on Toll-like Receptor 4, CD44, and MD-2," J Biol Chem (2007) 282, 18265-18275.
Triggs-Raine, B., et al., "Biology of hyaluronan: Insights from genetic disorders of hyaluronan metabolism," World J. Biol. Chem. (2015) 6(3), pp. 1-11.
Tsuneki, M., et al., "CD44 Influences Fibroblast Behaviors via Modulation of Cell-Cell and Cell-Matrix Interactions, Affecting Survivin and Hippo Pathways," J Cell Physiol (2016) 231, 731-743.
Yingsung, W., et al., "Molecular Heterogeneity of the SHAP-Hyaluronan Complex," J Biol Chem (2003) 278, 32710-32718.
Zhao, M., et al., "Evidence for the Covalent Binding of SHAP, Heavy Chains of Inter-α-Trypsin Inhibitor, to Hyaluronan," J Biol Chem (1995) 270, 26657-26663.
Zhu, L., et al., "Equivalent Involvement of Inter-α-trypsin Inhibitor Heavy Chain Isoforms in Forming Covalent Complexes with Hyaluronan," Connective Tissue Res (2008) 49, 48-55.
Zhuo, L., et al., "Inter-α-trypsin Inhibitor, a Covalent Protein-Glycosaminoglycan-Protein Complex," J. Biol. Chem. (2004) 279, 38079-38082.
Zhuo, L., et al., "SHAP Potentiates the CD44-mediated Leukocyte Adhesion to the Htaluronan Substratum," J Biol Chem (2006) 281, 20303-20314.
Zhuo, L., et al., "Structure and Function of Inter-α-Trypsin Inhibitor Heavy Chains," Connective Tissue Res (2008) 49, 311-320.
100. Jahrestagung der Deutschen Gesellschaft fur Pathologie e.V, Pathologe, Berlin, DE, vol. 37, No. 1,May 4, 2016 (May 4, 2016), pp. 3-156.
Huth, S. "In vitro und in vivo Analysen zur Charakterisierung des putativen Tumorsuppressorgens ITIH5 fur das Mammakarzinom sowie die Untersuchung von ITIH5 in der Haut". Dissertation, Jan. 9, 2015 (With Machine Generated English Translation).

\* cited by examiner

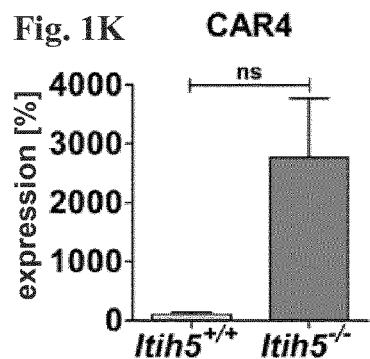
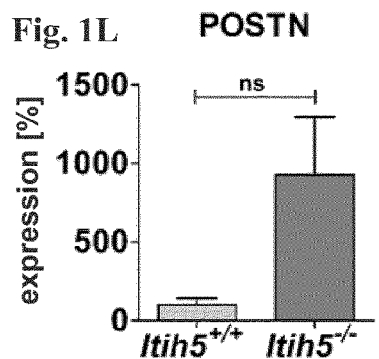
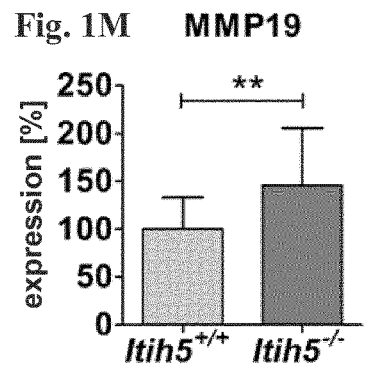
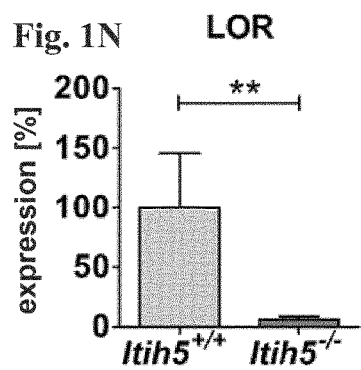
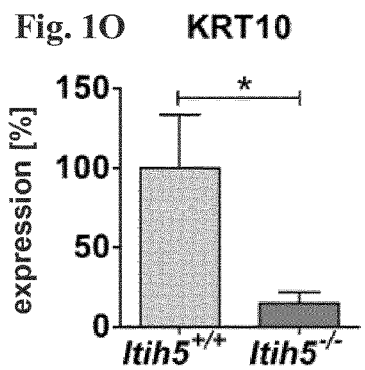
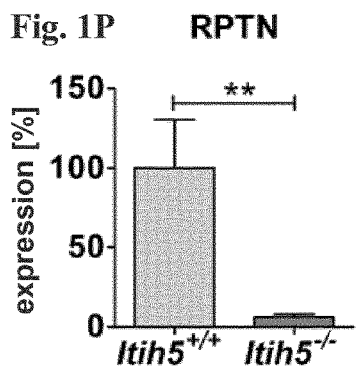
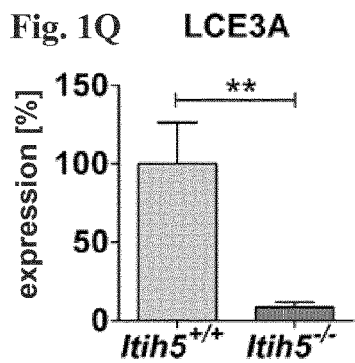

|  | 1 | 2 | 3 | 4 | 5 | 6 | 7 |
|---|---|---|---|---|---|---|---|
| HA | + | + | + | + | + | + | + |
| $CuSO_4$ | - | + | - | + | + | + | + |
| $H_2O_2$ | - | - | + | + | + | + | + |
| mItih5 | - | - | - | - | 100 ng/ml | 500 ng/ml | 1 µg/ml |

Fig. 5A
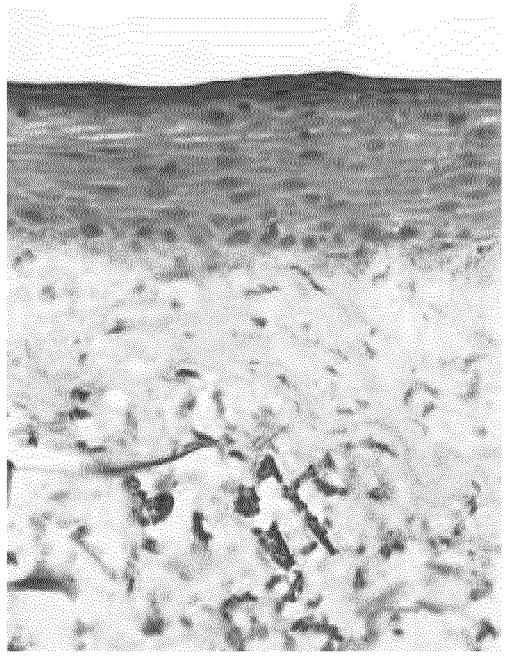
untreated control
Fig. 5B
+ rec. ITIH5
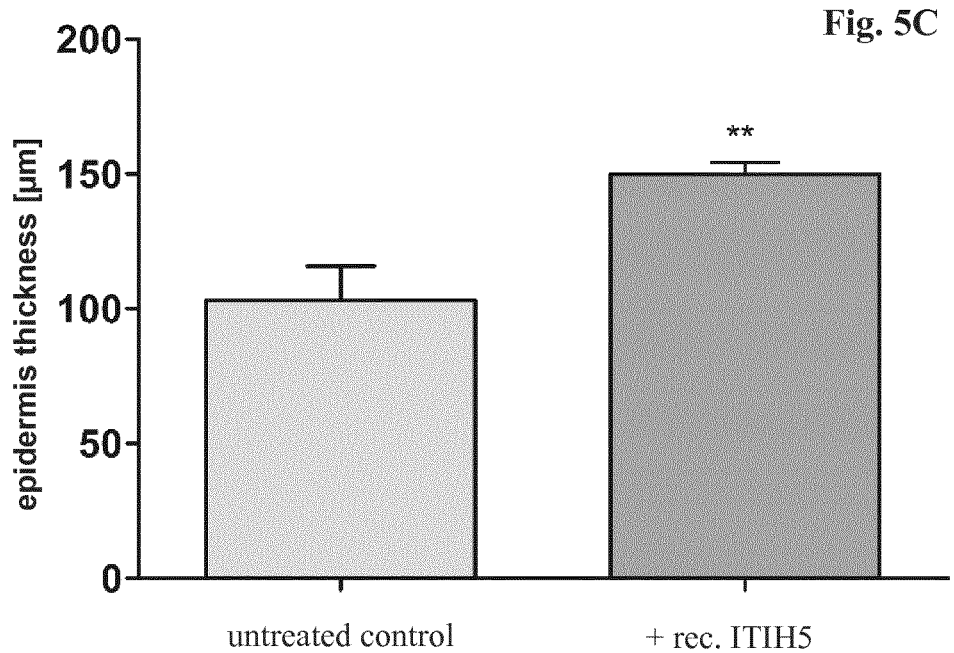
Fig. 5C Fig. 6 Gene ontology analysis of microarray results of *Itih5*[-/-] skin models.

| biological process | Ref No. | No. | expected | fold accumulation | p-value |
|---|---|---|---|---|---|
| keratinocyte differentiation | 106 | 56 | 14.47 | 3.87 | 5.72E-14 |
| epidermis development | 266 | 94 | 36.30 | 2.59 | 1.58E-13 |
| skin development | 245 | 95 | 33.43 | 2.84 | 1.20E-15 |
| formation of the skin barrier | 21 | 13 | 2.87 | 4.54 | 8.40E-05 |
| wound healing | 266 | 76 | 36.30 | 2.09 | 8.77E-08 |
| collagen metabolism | 42 | 19 | 5.73 | 3.31 | 6.04E-05 |
| negative regulation of the cell/matrix-adhesion | 33 | 13 | 4.50 | 2.89 | 2.31E-03 |
| organisation of the extracellular matrix | 184 | 61 | 25.11 | 2.43 | 2.63E-08 |
| glycosaminoglycane metabolism | 76 | 24 | 10.37 | 2.31 | 9.20E-04 |

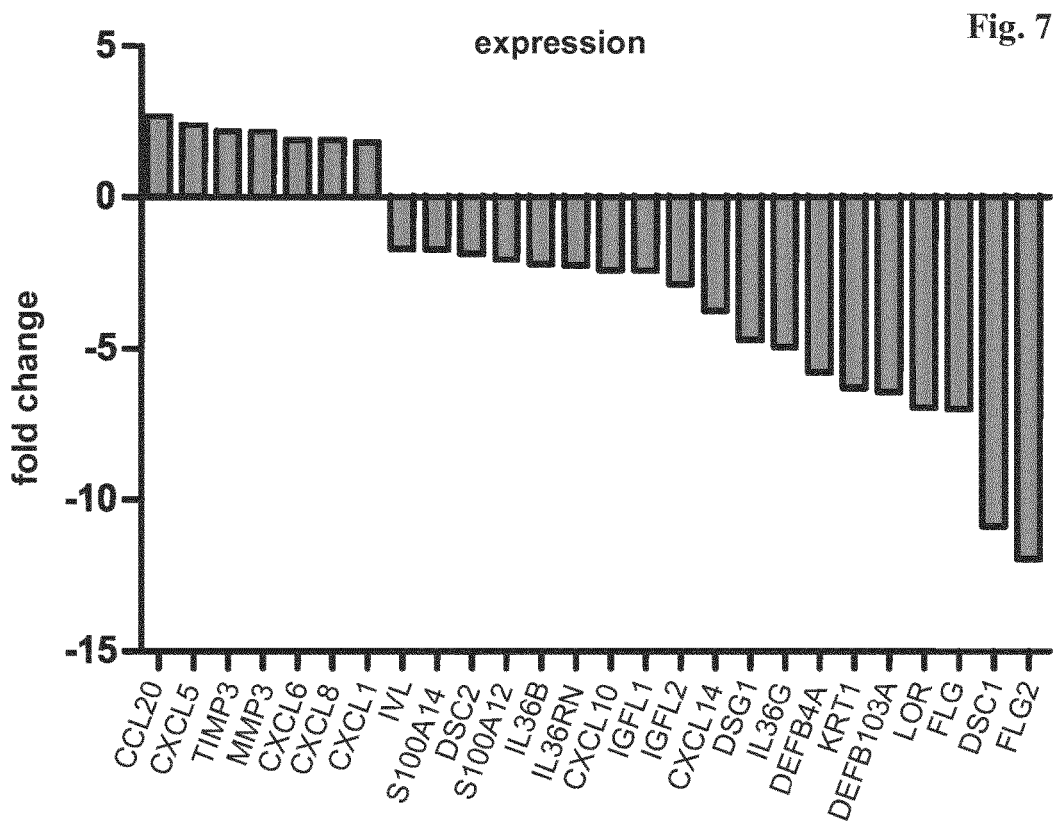

Fig. 7

HYALURONIC ACID STABILIZER

CROSS-REFERENCE TO RELATED APPLICATIONS

The present application claims the benefit of priority under 35 U.S.C. § of International Application No. PCT/EP2019/076289, filed on Sep. 27, 2019, which claims the benefit of the filing date of German patent application DE 10 2018 124 022.8, which was filed on Sep. 28, 2018. The content of these earlier filed applications is hereby incorporated by reference herein in its entirety.

FIELD OF THE DISCLOSURE

The present disclosure relates to a stabilizer of hyaluronic acid and of salts of the same, as well as a use thereof. The disclosure furthermore relates to a composition containing hyaluronic acid and the stabilizer. The disclosure also relates to a method for identifying a compound that is suitable as a stabilizer of hyaluronic acid or of a salt of the same.

BACKGROUND

The following discussion of the background is merely provided to aid the reader in understanding the invention and is not admitted to describe or constitute prior art to the present invention.

Hyaluronic acid, according to the new nomenclature hyaluronan (HA), is a major component of the extracellular matrix (FCM) of vertebrates. It is a negatively charged, linear, highly water-soluble glycosaminoglycan consisting of a repeat of n disaccharide units (-4GlcUAβ1-3GlcNAcβ1-) in which D-glucuronic acid and N-acetyl-D-glucosamine are linked with alternating β-1,3- and β-1,4-glycosidic bonds:

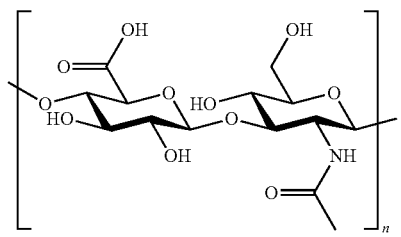

In contrast to most other glycosaminoglycans, which form proteoglycans, hyaluronan is not bound to a core protein.

Hyaluronic acid is an essential component of connective tissue and synovial fluid. Hyaluronic acid is being dynamically produced by most skin cells, mainly fibroblasts in the dermis and keratinocytes in the epidermis (Maytin, E. V., Glycobiology (2016) 26, 553-559). Hyaluronic acid is involved in a variety of physiological functions such as maintaining the elastoviscosity of liquid connective tissue such as synovial fluid in the joints and vitreous humour of the eye, controlling tissue hydration, osmotic balance and water transport, as well as cell proliferation, adhesion and migration. Hyaluronic acid is particularly pronounced in early embryogenesis and in tissues undergoing repair.

Solutions of hyaluronic acid are also excellent lubricants and can be used to allow tissue surfaces to slide over each other. For this reason, hyaluronic acid preparations are sometimes applied onto tissue in order to promote healing and/or reduce the potential for the formation of postoperative adhesion.

Due to its biological properties and functions, hyaluronic acid is of high economic relevance, its commercial value is far higher than that of other natural polysaccharides. Uses range from the medical sector to cosmetics and dietary supplements. Its viscoelastic properties, coupled with a complete absence of toxicity or immunogenicity, have led to a wide range of applications. In aesthetic dermatology, hyaluronic acid has become the most popular treatment for intradermal or deeper subcutaneous injections to improve wrinkles and other cosmetic defects.

Hyaluronic acid and its salts are degraded in the presence of hyaluronidases and free radicals. The effect of hyaluronan products in the skin can last up to 12 months (Fakhari A & Berkland C., Acta Biomaterialia (2013) 9, 7, 7081-7092). Nevertheless, ways to reduce the degradation of hyaluronic acid and its salts have been sought for years, in order to maintain the elasticity and moisture retention capacity of the skin.

According to international patent application WO 2005/110439, polyethylene glycol is added to a hyaluronan solution in order to increase the stability of hyaluronan. International patent application WO 2011/110894 suggests mannitol for this purpose. International patent application WO 2003/043660 discloses the use of diethylenetriaminepenta(methylenephosphonic acid) for reducing the decomposition rate of sodium hyaluronate in concentrations above 0.3%. US 2014/0004210 discloses the use of rosemary extract and vitamin A, or a precursor or derivative thereof, to inhibit hyaluronidases. International patent application WO 2018/118448 suggests the use of violet rice extract and dipotassium glycyrrhizate extract ((3β,20β)-20-Carboxy-11-oxo-30-norolean-12-ene-3-yl-2-O-β-D-glucopyranuronosyl-β-D-glucopyranosiduronic acid) to inhibit hyaluronidases. WO 2014/23272 discloses a derivative of hyaluronic acid with increased stability. It is a partially oxidized hyaluronic acid having α,β-unsaturated aldehyde groups.

SUMMARY

In a first aspect, the mammalian protein ITIH5 is disclosed for use in a method for alleviating or preventing skin aging and/or wrinkled skin. The mammalian protein ITIH5 is also disclosed for use in a method for alleviating or preventing rough skin and/or dry skin.

In a second aspect, the mammalian protein ITIH5 is disclosed herein for use in a method for treating arthritis or arthrosis of the joint or for treating an arthritic and/or arthrotic joint or a joint with arthrotic alterations.

In a related third aspect, there is disclosed a cosmetic, non-therapeutic use of the mammalian protein ITIH5 as a stabilizer of hyaluronic acid or a salt thereof.

In some embodiments according to the first, the second or the third aspect, the protein ITIH5 is the human protein, including a naturally occurring variant or isoform thereof. In some embodiments, the protein ITIH5 is the murine protein, including a naturally occurring variant or isoform thereof. In some embodiments, the protein ITIH5 is a recombinant protein. In some embodiments, the protein ITIH5 is a human or a murine recombinant protein. In some embodiments, the protein ITIH5 is a purified protein. In some embodiments, the protein ITIH5 is of medical quality.

In some embodiments according to the first, the second or the third aspect, the protein ITIH5 is a naturally occurring full-length protein. In some embodiments, the protein ITIH5 is a naturally occurring mature full-length protein.

In some embodiments according to the first, the second or the third aspect, the protein ITIH5 is a protein that contains or consists of amino acid positions 19 to 681 of the sequence of isoform 1 of Swissprot/Uniprot accession number Q86UX2, identifier: Q86UX2-1, version 2 of the sequence of 29 Apr. 2008, version 115 of the database entry of 12 Sep. 2018. In some embodiments the protein ITIH5 is a protein that contains or consists of amino acid positions 17 to 681 of the sequence of isoform 1 of Swissprot/Uniprot accession number Q86UX2, identifier: Q86UX2-1. In some embodiments the protein ITIH5 is a mature full-length protein having a consecutive sequence that is 99% identical to the consecutive sequence of amino acid positions 17 to 942 of the sequence of isoform 1 of Swissprot/Uniprot accession number Q86UX2, identifier: Q86UX2-1, version 2 of the sequence of 29 Apr. 2008, version 115 of the database entry of 12 Sep. 2018. In some embodiments the protein ITIH5 is a mature full-length protein having a consecutive sequence that is 99.5% identical to the consecutive sequence of amino acid positions 17 to 942 of the sequence of isoform 1 of said Swissprot/Uniprot accession number Q86UX2.

In some embodiments according to the first, the second or the third aspect, the protein ITIH5 is a protein that contains or consists of amino acid positions 19 to 681 of the sequence of human isoform 1 of Swissprot/Uniprot accession number Q86UX2, identifier: Q86UX2-1, version 2 of the sequence of 29 Apr. 2008, version 115 of the database entry of 12 Sep. 2018. In some embodiments the protein ITIH5 is a protein that contains or consists of amino acid positions 17 to 681 of the sequence of human isoform 1 of Swissprot/Uniprot accession number Q86UX2, identifier: Q86UX2-1. In some embodiments the protein ITIH5 is a mature full-length protein having a consecutive sequence that is 99% identical to the consecutive sequence of amino acid positions 17 to 942 of the sequence of isoform 1 of Swissprot/Uniprot accession number Q86UX2, identifier: Q86UX2-1, version 2 of the sequence of 29 Apr. 2008, version 115 of the database entry of 12 Sep. 2018. In some embodiments the protein ITIH5 is a mature full-length protein having a consecutive sequence that is 99.5% identical to the consecutive sequence of amino acid positions 17 to 942 of the sequence of isoform 1 of said Swissprot/Uniprot accession number Q86UX2.

In some embodiments according to the first, the second or the third aspect, the protein ITIH5 is a protein that contains or consists of amino acid positions 18 to 681 of the sequence of heavy chain H5 of murine inter-alpha-trypsin inhibitor of Swissprot/Uniprot accession number Q8BJD1, version 1 of the sequence dated 1 Mar. 2003, version 110 of the database entry dated 12 Sep. 2018. In some embodiments the protein ITIH5 is a mature full-length protein having a consecutive sequence that is 99% identical to the consecutive sequence of amino acid positions 18 to 681 of the sequence of heavy chain H5 of murine inter-alpha-trypsin inhibitor of Swissprot/Uniprot accession number Q8BJD1, version 1 of the sequence. In some embodiments the protein ITIH5 is a mature full-length protein having a consecutive sequence that is 99.5% identical to the consecutive sequence of amino acid positions 18 to 681 of the sequence of heavy chain H5 of murine inter-alpha-trypsin inhibitor of Swissprot/Uniprot accession number Q8BJD1, version 1 of the sequence. In some embodiments, ITIH5 is a protein that contains or consists of amino acid positions 18 to 952 of the sequence of said Swissprot/Uniprot accession number Q8BJD1. In some embodiments the protein ITIH5 is a mature full-length protein having a consecutive sequence that is 99% identical to the consecutive sequence of amino acid positions 18 to 952 of the sequence of said Swissprot/Uniprot accession number Q8BJD1. In some embodiments the protein ITIH5 is a mature full-length protein having a consecutive sequence that is 99.5% identical to the consecutive sequence of amino acid positions 18 to 952 of the sequence of said Swissprot/Uniprot accession number Q8BJD1.

In some embodiments according to the first or third aspects, the use includes administering the mammalian protein ITIH5 to and/or into a biological keratinic structure such as keratinic tissue. In some embodiments, the use includes administering the mammalian protein ITIH5 to and/or into the skin of a subject. In some embodiments, such a use includes administering the mammalian protein ITIH5 through the skin barrier of a subject, for example a person. In some embodiments, such a use involves combining administering the mammalian protein ITIH5 with laser treatment or thermomechanical ablation. In some embodiments, such a use involves combining administering the mammalian protein ITIH5 with a needling treatment.

In some embodiments according to the second or third aspects, the use includes administering the mammalian protein ITIH5 into a joint, for example an intra-articular injection of ITIH5.

In a related fourth aspect, the mammalian protein ITIH5 is disclosed for use in a method that involves administering the same to a subject suffering from reduced hyaluronic acid. Since by a use disclosed herein hyaluronic acid is being stabilized, its degradation is being reduced and thereby indirectly the amount of hyaluronic acid is being increased.

In a related fifth aspect, there is disclosed a method for alleviating or preventing one or more skin problems. The skin problem(s) may be acne and/or acne scars. The skin problem(s) may also be or include skin atrophy. For example, the skin problem(s) may be an adverse effect of a topical glucocorticoid treatment. A respective skin problem may also be a pressure ulcer (decubitus). The method includes administering ITIH5.

In some embodiments, the method according to the fifth aspect includes administering the mammalian protein ITIH5 to and/or into a biological keratinous structure such as keratinous tissue. In some embodiments, the use includes administering the mammalian protein ITIH5 to and/or into the skin of a subject. In some embodiments, such a method includes administering the mammalian protein ITIH5 through the skin barrier of a subject, for example of a person. In some embodiments, such a method includes combining administering the mammalian protein ITIH5 with laser treatment or thermomechanical ablation. In some embodiments, such a method includes combining administering the mammalian protein ITIH5 with a needling treatment.

In some embodiments of the method according to the fifth aspect, the skin problem or the skin problems concern(s) a subject suffering from a reduced level of hyaluronic acid. Since by means of a method disclosed herein hyaluronic acid is being stabilized, a reduced degradation thereof occurs, thereby indirectly increasing the amount of hyaluronic acid.

In a sixth aspect, there is disclosed a method for the treatment or prevention of osteoarthritis (arthrosis) and/or arthritis. The method includes administering ITIH5. This method may include injection into a joint affected by osteoarthritis and/or arthritis. This method may also include injection into a joint known to be at increased risk of osteoarthritis and/or arthritis.

In a seventh aspect, there is disclosed a composition containing the mammalian protein ITIH5. The mammalian protein ITIH5 is typically a naturally occurring mature full-length protein. In some embodiments, the mammalian protein ITIH5 is of medical quality.

The composition typically defines a solution, for instance an aqueous solution or a gel. In some embodiments, the composition essentially consists of the mammalian protein ITIH5 and water. In some embodiments the composition contains the mammalian protein ITIH5 and water.

In some embodiments the composition contains a protein ITIH5 that differs from the protein defined by amino acid positions 1 to 681 of the sequence of Swissprot/Uniprot accession number Q86UX2, version 2 of the sequence of 29 Apr. 2008, version 115 of the database entry of 12 Sep. 2018. In some embodiments the composition contains a protein ITIH5 that differs from the protein that (a) is defined by amino acid positions 1 to 569 and 571 to 681 of the sequence of Swissprot/Uniprot accession number Q86UX2, version 2 of the sequence of 29 Apr. 2008, version 115 of the database entry of 12 Sep. 2018, and (b) contains a proline at position 570 of the sequence of said Swissprot/Uniprot accession number Q86UX2. In some embodiments the composition contains a protein ITIH5 that differs from the protein defined by amino acid positions 1 to 680 of the sequence of said Swissprot/Uniprot accession number Q86UX2. In some embodiments the composition contains a protein ITIH5 that differs from the protein that (a) is defined by amino acid positions 1 to 569 and 571 to 680 of the sequence of said Swissprot/Uniprot accession number Q86UX2, and (b) contains a proline at position 570 of the sequence of said Swissprot/Uniprot accession number Q86UX2.

The composition according to the seventh aspect in some embodiments contains 0.1 to 25% by weight of the mammalian protein ITIH5, based on the total weight of the composition.

In some embodiments of the composition, ITIH5 is the respective human protein. In some embodiments, the composition according to the seventh aspect is a pharmaceutical formulation or is included in a pharmaceutical formulation. In some embodiments, the composition according to the seventh aspect is a cosmetic composition or is included in a cosmetic formulation. In some embodiments, the composition according to the seventh aspect is a pharmaceutical or a cosmetic formulation.

In some embodiments, the composition furthermore contains a filling material. Such a filling material or filler is a material capable of filling skin tissue. Such a filler may contain a protein, a polysaccharide or a mixture thereof. Such a filler may also consist of protein, a polysaccharide or a mixture thereof. Such a filler may also contain collagen and/or alginate. A respective filler may also essentially consist of a protein, a polysaccharide or a mixture thereof. Such a filler may also contain or essentially consist of collagen and/or alginate. A respective filler may also contain or essentially consist of dextran and/or elastin. Such a filler may also contain or essentially consist of polyurethane and/or hyaluronic acid, a salt or an ester thereof. In one embodiment, the composition according to the seventh aspect contains the mammalian protein ITIH5 and hyaluronic acid, or a salt or an ester of hyaluronic acid. In one embodiment, the composition consists essentially of the mammalian protein ITIH5, hyaluronic acid—or a salt or ester thereof—and water. In some embodiments the hyaluronic acid is of medical quality.

The composition according to the seventh aspect is in some embodiments a formulation for injection. The formulation may for instance be for intradermal or deeper subcutaneous injection. In some embodiments, the composition is a pharmaceutically acceptable injectable formulation. In some embodiments, the composition is an intraarticular formulation for the treatment of osteoarthritis. The formulation may be a formulation for intra-articular injection. In some embodiments, the composition is a formulation for single injection.

In some embodiments, the composition contains a cosmetically and/or pharmaceutically acceptable excipient. In some embodiments, the composition further contains a local anaesthetic. Examples of a suitable local anaesthetic are lidocaine and mepivacaine. In one embodiment, lidocaine is included in the composition at 0.3% by weight, based on the total weight of the composition.

In some embodiments the composition furthermore contains hyaluronic acid, a salt or an ester thereof. In some embodiments, the composition contains hyaluronic acid having an average molecular weight of about 600 kilodaltons or more, or of about 800 kilodaltons or more. In some embodiments, the hyaluronic acid included in the composition has an average molecular weight of about 1000 kilodaltons or more, including, for example, about 1500 kilodaltons or more. In some embodiments, the hyaluronic acid included in the composition has an average molecular weight of about 3000 kilodaltons or more.

In some embodiments, the composition contains 0.05 to 20% by weight of hyaluronic acid, based on the total weight of the composition. In some embodiments, the composition contains 0.5 to 15% by weight of hyaluronic acid, based on the total weight of the composition. In some embodiments, the composition contains 1 to 25% by weight of hyaluronic acid, based on the total weight of the composition. In some embodiments the composition contains 3 weight percent or more of hyaluronic acid. Unless explicitly stated otherwise, all values in terms of weight disclosed herein are expressed as a percentage by weight of the total weight of the composition in question.

In some embodiments, the composition contains 0.1 to 15% by weight of the mammalian protein ITIH5, based on the total weight of the composition. In some embodiments, the composition contains from 1 to 10% by weight of the mammalian protein ITIH5, based on the total weight of the composition.

In some embodiments, the composition further contains a local anaesthetic.

In some embodiments, the composition furthermore contains one or more amino acids. In some embodiments the composition furthermore contains chondroitin sulphate or diglycerin. In some embodiments, the composition furthermore contains erythritol. In some embodiments the composition furthermore contains fructose and/or glucose. In some embodiments, the composition furthermore contains mannose and/or galactose. In some embodiments, the composition furthermore contains laevulose and/or lactose. In some embodiments, the composition furthermore contains glycerol and/or a glycerol polymer. In some embodiments, the composition furthermore contains glycol and/or 1,2,6-hexanetriol. In some embodiments the composition furthermore contains propylene glycol. In some embodiments, the composition furthermore contains honey, including hydrogenated honey. In some embodiments the composition furthermore contains trehalose and/or xylitol. In some embodiments the composition furthermore contains sorbitol and/or sucrose. In some embodiments the composition furthermore contains inositol and/or lactitol. In some embodiments the composition furthermore contains maltitol and/or maltose.

In some embodiments, the composition furthermore contains mannitol. In some embodiments, the composition furthermore contains a hydrogenated starch hydrolysate. In some embodiments the composition furthermore contains PEG-15 butanediol. In some embodiments the composition furthermore contains polyglyceryl sorbitol and/or saccharide isomerate. In some embodiments, the composition furthermore contains one or more salts of pyrrolidone carboxylic acid. In some embodiments the composition furthermore contains sodium glucuronate and/or urea.

The composition according to the seventh aspect is in some embodiments a skin care product for topical application, or a component thereof. In some embodiments, the composition is suitable for use in injectable form. In some embodiments the composition is a preparation for intradermal or subcutaneous injection, or a component thereof.

In an eighth aspect there is disclosed a method for cosmetic treatment. In some embodiments the method is a method for the cosmetic treatment of a biological keratinic structure such as keratinic tissue. In such embodiments, the mammalian protein ITIH5 is applied to and/or into the biological keratinic structure such as keratinic tissue. In some embodiments, this method involves applying the mammalian protein ITIH5 to a person. In some embodiments, such a method includes applying the mammalian protein ITIH5 through the skin barrier of a subject, for example of a person. In some embodiments, the subject is a person suffering from reduced hyaluronic acid levels. Typically, the mammalian protein ITIH5 is applied to or into the skin of the corresponding subject in such embodiments.

In some embodiments, such a method includes combining administering the mammalian protein ITIH5 with laser treatment or thermomechanical ablation. In some embodiments, such a method involves combining administering the mammalian protein ITIH5 with a needling treatment.

A cosmetic treatment according to the eighth aspect may in some embodiments aim at improving skin quality, skin tone and/or facial volume. A cosmetic treatment according to the eighth aspect may also aim at counteracting the decrease of hyaluronic acid in the skin that is associated with the aging process.

In a ninth aspect, there is disclosed a binding agent binding to ITIH5 for use in treating or preventing an inflammatory response. Typically such an inflammatory response is or includes dermatitis. In some embodiments the binding agent is an antibody. In some embodiments the binding agent is or includes an immunoglobulin or an immunoglobulin fragment.

In some embodiments, a binding agent binding to ITIH5 is disclosed for use in a method of alleviating or preventing allergic contact dermatitis. In some embodiments, a binding agent binding to ITIH5 is disclosed for use in a method of alleviating or preventing atopic dermatitis. In some embodiments the binding agent is an antibody. In some embodiments the binding agent is or includes an immunoglobulin or an immunoglobulin fragment.

In a tenth aspect, there is disclosed an in vitro method for identifying a compound suitable as a stabilizer of hyaluronic acid and/or of a salt thereof. The method includes contacting a compound to be tested with ITIH5 in the presence of hyaluronic acid of a given molecular weight, or a salt thereof, in a solution that contains a Cu(II) salt and $H_2O_2$. The method furthermore includes determining the molecular weight of the hyaluronic acid or salt thereof after a predetermined time interval. A decrease in the molecular weight of hyaluronic acid that is lower when compared to a control, indicates that the compound to be tested is suitable as a stabilizer of hyaluronic acid or a salt thereof.

The summary described above is not limiting and further features and advantages of the method and use described herein should be apparent from the following detailed description, the figures and the claims.

BRIEF DESCRIPTION OF THE FIGURES

FIG. 1A depicts Itih5$^{+/+}$ skin models with van Gieson staining. FIG. 1B depicts Itih5$^{+/-}$ skin models using HABP. Green and blue colours contained in the original image are shown in unchanged form, with green showing hyaluronic acid and blue showing nuclei. FIG. 1C depicts Itih5$^{+/+}$ skin models using HABP. The blue colour in the original image, showing nuclei, was reduced to almost black by reducing the colour intensity. Thus FIG. 1C essentially shows the green colour indicating hyaluronic acid contained in the original image. FIG. 1D depicts Itih5$^{+/+}$ tissue stained with HABP. Signals of the green colour present, contained in the original image, which indicates hyaluronic acid, were reduced to almost black by reducing the colour intensity. FIG. 1D therefore essentially shows the blue colour contained in the original image, which shows nuclei. FIG. 1E depicts Itih5$^{-/-}$ skin models using van Gieson staining. FIG. 1F depicts Itih5$^{+/+}$ skin models using HABP. The green and blue colours contained in the original image are shown in unchanged form, wherein green again indicates hyaluronic acid and blue indicates nuclei. FIG. 1G depicts Itih5" skin models using HABP. The colour intensity of the blue colour present in the original image, indicating nuclei, has been reduced to such an extent that the signals are almost reduced to black. FIG. 1G thus essentially shows green colour contained in the original image, which represents hyaluronic acid. FIG. 1H depicts Itih5$^{-/-}$ tissue using HABP. The green colour in the original image, which shows hyaluronic acid, is reduced to almost black by reducing the colour intensity. FIG. 1H therefore essentially shows the blue colour contained in the original image, which shows nuclei. FIG. 1I shows a microarray analysis showing differently expressed genes in Itih5$^{-/-}$ skin models compared to WT controls. Gene expression was measured using the Affymetrix® Mouse Gene 2.0 ST Array. FIGS. 1K to 1Q show the result of a TaqMan real-time PCR analysis of selected genes, namely CAR4 (FIG. 1K), POSTN (FIG. 1L), MMP19 (FIG. 1M), LOR (FIG. 1N), KRT10 (FIG. 1O), RPTN (FIG. 1P) and LCE3A (FIG. 1Q). The mean values of two independent experiments are shown with triple values+/-standard deviation. *p<0.05, **p<0.01.

FIG. 3 shows that an ITIH5 knockdown decreases the cell-matrix adhesion of normal human dermal fibroblasts (NHDFs) on hyaluronic acid.

FIG. 4 shows that Itih5 plays a crucial role in allergic contact dermatitis.

FIG. 5 shows that injection of recombinant ITIH5 protein results in an increase in epidermis thickness in human 3D skin models. FIGS. 5A and B show exemplary cross-sections of an untreated 3D skin model (FIG. 5A) and a model into which recombinant ITIH5 protein was injected (FIG. 5B).

FIG. 5C: The thickness of the epidermis was measured at 6 different points of the cross-sections. The evaluation shows that the models into which ITIH5 was injected have a significantly ($p<0.01$) higher epidermis thickness.

FIG. 6 depicts tabular data for gene ontology analysis of microarray data from Itih5$^{-/-}$ skin models.

FIG. 7 depicts a microarray analysis showing differently expressed genes in skin models injected with ITIH5 compared to untreated 3D skin models. Gene expression was measured with the Clariom S Array.

DETAILED DESCRIPTION

Definitions

Figure 1:
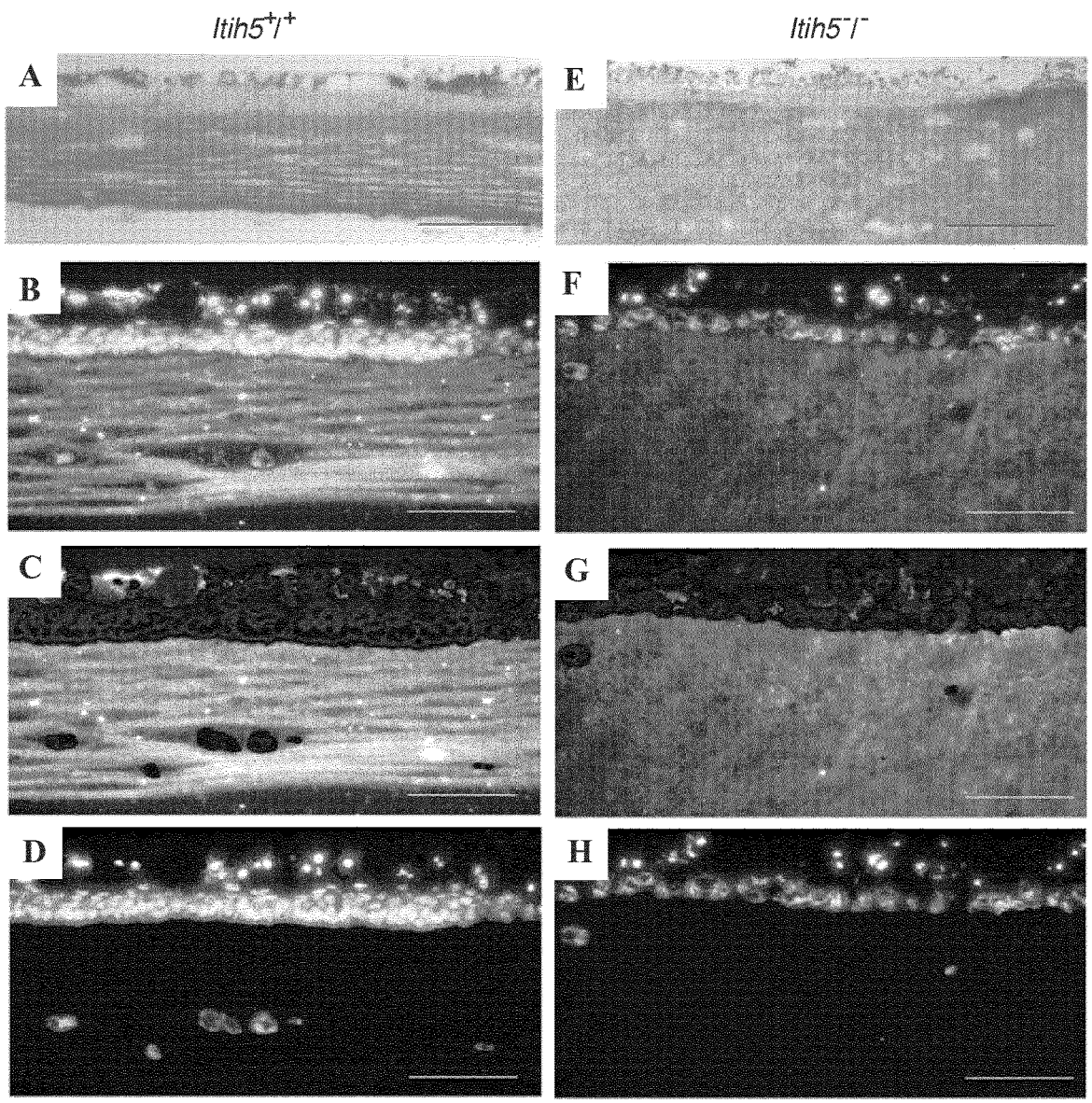
FIG. 1 shows that ITIH5 stabilizes ECM structures and modulates gene expression. The analysis of ECM structures in 3D skin models of Itih5$^{+/+}$ and Itih5$^{-/-}$ mice was done using van Gieson staining and a hyaluronan binding protein (HABP). Representative images are shown.
Figure 1:
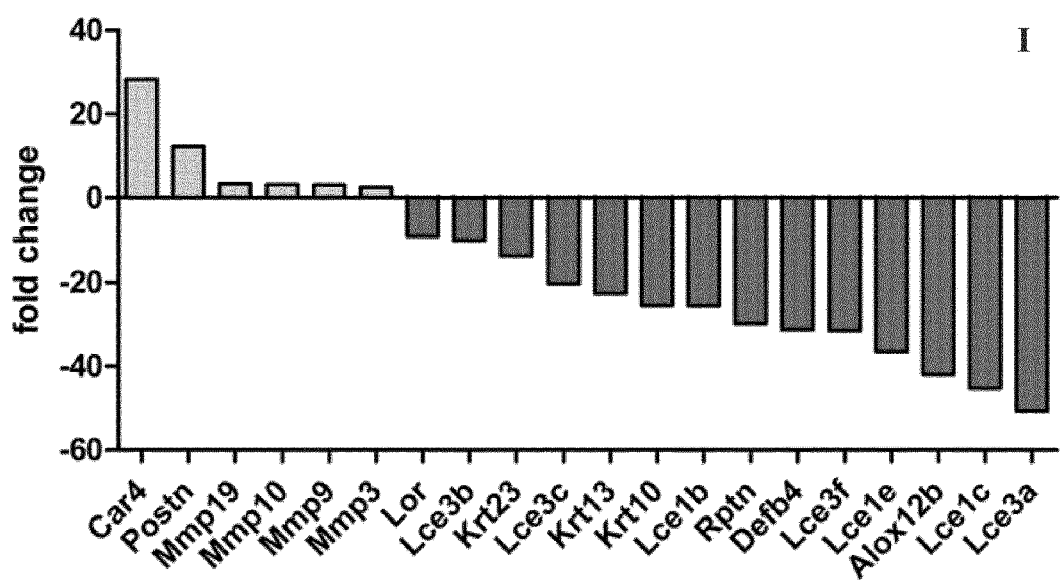

Unless otherwise defined, all other scientific and technical terms used in the description, figures and claims have their ordinary meaning as commonly understood by one of ordinary skill in the art. Although similar or equivalent methods and materials to those described herein can be used in the practice or testing of the binding members, nucleic acids, vectors, host cells, compositions, methods and uses disclosed herein, suitable methods and materials are described below.

Unless otherwise stated, the following terms and expressions, when used in this document, including description and claims, have the meanings given below.

The word "about" as used herein refers to a value being within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. The term "about" is also used to indicate that the amount or value in question may be the value designated or some other value that is approximately the same. The phrase is intended to convey that similar values promote equivalent results or effects as described herein. In this context "about" may refer to a range above and/or below of up to 10%. The word "about" refers in some embodiments to a range above and below a certain value that is up to 5%, such as up to up to 2%, up to 1%, or up to 0.5% above or below that value. In one embodiment "about" refers to a range up to 0.1% above and below a given value.

The term "antibody" includes, but is not limited to, an immunoglobulin and a fragment thereof, but it also includes a proteinaceous binding molecule with immunoglobulin-like function. An antibody fragment generally contains an antigen binding or variable region. Examples of (recombinant) antibody fragments are immunoglobulin fragments such as Fab fragments, Fab' fragments, Fv fragments, single-chain Fv fragments (scFv), diabodies or domain antibodies (Holt, L. J., et al., Trends Biotechnol. (2003), 21, 11, 484-490). An example of a proteinaceous binding molecule with immunoglobulin-like functions is a mutein based on a polypeptide of the lipocalin family (WO 03/029462, Beste et al., Proc. Natl. Acad. Sci. USA (1999) 96, 1898-1903). Lipocalins, such as the bilin binding protein, the human neutrophil gelatinase-associated lipocalin, human Apolipoprotein D or glycodelin, possess natural ligand-binding sites that can be modified so that they bind to selected small protein regions known as haptens. Examples of other proteinaceous binding molecules are the so-called glubodies (see e.g. international patent application WO 96/23879 or Napolitano, E. W., et al., Chemistry & Biology (1996) 3, 5, 359-367), proteins based on the ankyrin scaffold (Mosavi, L. K., et al., Protein Science (2004) 13, 6, 1435-1448) or crystalline scaffold (e.g. internation patent application WO 01/04144), the proteins described in Skerra, J. Mol. Recognit. (2000) 13, 167-187, AdNectins, tetranectins and avimers. Avimers contain so called A-domains that occur as strings of multiple domains in several cell surface receptors (Silverman, J., et al., Nature Biotechnology (2005) 23, 1556-1561). Adnectins, derived from a domain of human fibronectin, contain three loops that can be engineered for immunoglobulin-like binding to targets (Gill. D. S. & Damle, N. K., Current Opinion in Biotechnology (2006) 17, 653-658). Tetranectins, derived from the respective human homotrimeric protein, likewise contain loop regions in a C-type lectin domain that can be engineered for desired binding (ibid.). Peptoids, which can act as protein ligands, are oligo(N-alkyl) glycines that differ from peptides in that the side chain is connected to the amide nitrogen rather than the a carbon atom. Peptoids are typically resistant to proteases and other modifying enzymes and can have a much higher cell permeability than peptides (see e.g. Kwon, Y.-U., and Kodadek, T., J. Am. Chem. Soc. (2007) 129, 1508-1509). A suitable antibody may in some embodiments also be a multispecific antibody that includes several immunoglobulin fragments.

An immunoglobulin or a proteinaceous binding molecule with immunoglobulin-like functions may be PEGylated or hyperglycosylated if desired. In some embodiments a proteinaceous binding molecule with immunoglobulin-like functions is a fusion protein of one of the exemplary proteinaceous binding molecules above and an albumin-binding domain, for instance an albumin-binding domain of streptococcal protein G. In some embodiments a proteinaceous binding molecule with immuno-globulin-like functions is a fusion protein of an immunoglobulin fragment, such as a single-chain diabody, and an immunoglobulin binding domain, for instance a bacterial immunoglobulin binding domain. As an illustrative example, a single-chain diabody may be fused to domain B of staphylococcal protein A as described by Unverdorben et al. (Protein Engineering. Design & Selection [2012]25, 81-88).

An immunoglobulin may be monoclonal or polyclonal. The term "polyclonal" refers to immunoglobulins that are heterogenous populations of immunoglobulin molecules derived from the sera of animals immunized with an antigen or an antigenic functional derivative thereof. For the production of polyclonal immunoglobulins, one or more of various host animals may be immunized by injection with the antigen. Various adjuvants may be used to increase the immunological response, depending on the host species. "Monoclonal immunoglobulins", also called "monoclonal antibodies", are substantially homogenous populations of immunoglobulins to a particular antigen. They may be obtained by any technique which provides for the production of immunoglobulin molecules by continuous cell lines in culture. Monoclonal immunoglobulins may be obtained by methods well known to those skilled in the art (see for example, Köhler et al., Nature (1975) 256, 495-497, and (J. S. U.S. Pat. No. 4,376,110). An immunoglobulin or immunoglobulin fragment with specific binding affinity only for e.g. ITIH5 can be isolated, enriched, or purified from a prokaryotic or eukaryotic organism. Routine methods known to those skilled in the art enable production of both immunoglobulins or immunoglobulin fragments and proteinaceous binding molecules with immunoglobulin-like functions, in both prokaryotic and eukaryotic organisms.

The term "consisting of" as used in this document means inclusive and limited to what follows the term "consisting of". The term "consisting of" thus indicates that listed elements are necessary or necessary and that no other elements may be present. The term "essentially consisting of" is understood to mean that it includes any elements defined after the expression and that other elements, such as a sample or a composition, may be present which do not alter, i.e. do not affect or contribute to, the activity or effect indicated for the elements concerned in this document. In other words, the term "essentially consisting of" indicates that the defined elements are necessary or required, but that other elements are optional and may or may not be present, depending on whether or not they are relevant to the effect or effectiveness of the defined elements.

The term "substantially identical", when used herein in conjunction with two nucleic acids or polypeptides, refers to a sequence that has at least 95% sequence identity with a reference sequence. The percentage identity can be any integer from 95% to 100%. In some embodiments the identity is at least 96% or at least 97% compared to a reference sequence using BLAST with standard parameters. In some embodiments the identity is at least 98% or at least 98.5% using BLAST with standard parameters. In some embodiments the identity is at least 99% or at least 99.5% compared to a reference sequence using BLAST with standard parameters.

Nucleic acid or protein sequences which are substantially identical to a reference sequence normally contain one or more "conservatively modified variants". For nucleic acid sequences, a conservatively modified variant refers to nucleic acids encoding identical or substantially identical amino acid sequences or, if the nucleic acid sequence does not encode an amino acid sequence, to substantially identical sequences. The degeneration of the genetic code results in a considerable number of functionally identical nucleic acids coding for a specific protein. For example, the codons GCA, GCC, GCG and GCU all encode the amino acid alanine. Thus, at any position where an alanine is specified by a codon, the codon may be changed into any of the corresponding other codons without changing the encoded polypeptide. Such nucleic acid sequence variants are "silent variations" that represent a form of conservatively modified variations. Each nucleic acid sequence described herein that encodes a polypeptide can also be used to determine any possible silent variation of the nucleic acid. Accordingly, any silent variation of a nucleic acid molecule encoding a polypeptide is implicitly disclosed in any sequence described herein.

For a protein or peptide, a substantially identical sequence may contain one or more, for example up to five or up to four conservative substitutions. Examples of conservative substitutions include:
1. Substituting alanine (A) by valine (V);
2. Substituting arginine (R) by lysine (K);
3. Substituting asparagine (N) by glutamine (Q);
4. Substituting aspartic acid (D) by glutamic acid (E);
5. Substituting cysteine (C) by serine(S);
6. Substituting glutamic acid (E) by aspartic acid (D);
7. Substituting glycine (G) by alanine (A);
8. Substituting histidine (H) by arginine (R) or lysine (K);
9. Substituting isoleucine (I) by leucine (L);
10. Substituting methionine (M) by leucine (L);
11. Substituting phenylalanine (F) by tyrosine (Y);
12. Substituting proline (P) by alanine (A);
13. Substituting serine(S) by threonine (T);
14. Substituting tryptophan (W) by tyrosine (Y); Substituting phenylalanine (F) by tryptophan (W); and/or
15. Substituting valine (V) by leucine (L) and vice versa.

The term "biological keratinic structure" generally refers to a biological structure consisting at least in part of keratin or containing keratin. This may be hair and nails, for example. It may also be a tissue such as skin. Such a tissue can be either autologous or artificial.

An "effective amount" of a composition disclosed herein is an amount—either as a single dose or as part of a series of doses—which at the dosage regimen applied yields the desired therapeutic effect, i.e., to reach a certain treatment goal. A therapeutically effective amount is an amount which, when administered to a subject in need, reaches a concentration which has a positive biological effect in the treatment, prevention or alleviation of skin problems and/or lesions such as wounds or ulcers or, for example, sears or in the treatment of arthritic joints. Such an effective amount may be determined by the treating physician of a patient or by the veterinarian of an affected animal and may be determined by common techniques. Factors influencing the therapeutically effective amount include, for example, the type of administration or, where appropriate, the type of lesion, such as mechanical or thermal, full or partial thickness, and size and depth of a lesion. The age of the affected subject can also play a role.

The terms "expressing" and "expression" in reference to a protein/polypeptide are intended to be understood in the ordinary meaning as used in the art. A peptide/protein is expressed by a cell via transcription of a nucleic acid into mRNA, followed by translation into a polypeptide, which is folded and possibly further processed. Hence, the statement that a cell is expressing a peptide/protein implies that the peptide/protein has been synthesized by the expression machinery of the respective cell.

With regard to the respective biological process itself, the terms "expression", "gene expression" or "expressing" refer to the entirety of regulatory pathways converting the information encoded in the nucleic acid sequence of a gene first into messenger RNA (mRNA) and then to a protein. Accordingly, the expression of a gene includes its transcription into a primary hnRNA, the processing of this hnRNA into a mature RNA and the translation of the mRNA sequence into the corresponding amino acid sequence of the protein. In this context, it is also noted that the term "gene product" refers not only to a protein, including e.g. a final protein (including a splice variant thereof) encoded by that gene and a respective precursor protein where applicable, but also to the respective mRNA, which may be regarded as the "first gene product" during the course of gene expression The conjunctional expression "and/or" between several elements, when used here, is understood as both individual and combined options comprehensively. For example, if two elements are linked by "and/or", a first option concerns the use of the first element without the second one. A second option concerns the use of the second element without the first one. A third option concerns the use of the first and second elements together. It is understood that any of these options falls under the meaning of the term and thus satisfies the conditions of the term "and/or" as used in this document.

The word "or" as used herein means any one member of a particular list and also includes any combination of members of that list.

The term "isolated" indicates that matter such as a peptide or a nucleic acid molecule has been removed from its normal physiological environment, e.g. a natural source, or that a peptide or nucleic acid is synthesized. Use of the term "isolated" indicates that a naturally occurring sequence has been removed from its normal cellular (i.e., chromosomal) environment. Thus, the sequence may be in a cell-free solution or placed in a different cellular environment. By "isolated" in reference to a polypeptide or nucleic acid molecule is meant a polymer of amino acids (2 or more amino acids) or nucleotides coupled to each other, including a polypeptide or nucleic acid molecule that is isolated from a natural source or that is synthesized. The term "isolated" does not imply that the sequence is the only amino acid chain or nucleotide chain present, but that it is essentially free, e.g. about 90-95% pure or more, of e.g. non-amino acid material and/or non-nucleic acid material, respectively, naturally associated with it.

The terms "polypeptide" and "protein" refer to a polymer of amino acid residues and are not limited to a certain minimum length of the product. Where both terms are used concurrently, this twofold naming accounts for the use of both terms side by side in the art.

The term "preventing" in the medical/physiological context, i.e. in the context of a physiological state, refers to decreasing the probability that an organism contracts or develops an abnormal condition.

The term "purified" is understood to be a relative indication in comparison to the original environment of a binding member, thereby representing an indication that the binding member is relatively purer than in the natural environment. It therefore includes, but does not only refer to, an absolute value in the sense of absolute purity from other proteinaceous binding molecules with immunoglobulin-like function, immunoglobulins or antibody fragments. Compared to the original level, the level after purifying the binding member will generally be at least 2-5 fold greater (e.g., in terms of mg/ml). Purification of at least one order of magnitude, such as about two or three orders, including for example about four or five orders of magnitude is expressly contemplated. It may be desired to obtain the binding member at least essentially free of contamination, in particular free of other proteinaceous matter, at a functionally significant level, for example about 90%, about 95%, or 99% pure. With regard to other matter such as a nucleic acid molecule, a peptide or a protein, or a cell, the above applies mutatis mutandis.

"Similar" protein sequences are those which, when aligned, share similar amino acid residues and most often, but not mandatorily, identical amino acid residues at the same positions of the sequences to be compared. Similar amino acid residues are grouped by chemical characteristics of the side chains into families. These families are described below for "conservative amino acid substitutions". The "percent similarity" between sequences is the number of positions that contain identical or similar residues at the same sequence positions of the sequences to be compared divided by the total number of positions compared and multiplied by 100%. For instance, if 6 out of 10 sequence positions have identical amino acid residues and 2 out of 10 positions contain similar residues, then the sequences have 80% similarity. The similarity between two sequences can e.g. be determined using EMBOSS Needle.

The term "reactive oxygen species" refers to chemically reactive oxygen-containing molecules, including radicals and ions derived from molecular oxygen. Examples are peroxides, the hyperoxide anion (superoxide anion) $O_2^-$, the hydroxyl radical $OH^-$, the hydroperoxyl radical $HOO^-$, singlet oxygen $^1O_2$ (excited oxygen molecules), ozone $O_3$ and hydrogen peroxide $H_2O_2$. A commented compilation of some reactive oxygen species can be found in Table 2 of international patent application WO 2011/110894.

Reactive oxygen species are formed in the mitochondria as a by-product of cellular respiration. Reactive oxygen species are furthermore part of the killing response of immune cells to microbial invasions, and act as messengers in normal cell signal transduction as well as in the cell cycle. Environmental toxins and cigarette smoke are other important sources of reactive oxygen species. Cells possess a number of defence mechanisms to mitigate the harmful effects of reactive oxygen species. The enzyme superoxide dismutase catalyses the conversion of two hyperoxide anions into a molecule of hydrogen peroxide and a molecule of oxygen. In the peroxisomes of eukaryotic cells, the enzyme catalase converts hydrogen peroxide into water and oxygen.

The term "subject" as used herein, also addressed as an individual, refers to a living organism, typically a mammal. Examples of a subject are a human being or a dog. Also a cow or a horse are examples of a subject. Other examples of a subject are a monkey or a pig. Examples of a subject are also a rat or a mouse. A guinea pig or a hamster are further examples of a subject. Furthermore, a cat or a rabbit are examples of a subject. Another example of a subject is a transgenic non-human animal. In some embodiments, the subject is a human.

Singular forms such as "a", "an" or "the" include plural references unless the context clearly indicates otherwise. Thus, for example, reference to a "cell" includes a single cell as well as a plurality of cells. In some cases, the term "one or more" is used explicitly to indicate that the singular form includes the plural form. Such explicit indications do not limit the general meaning of the singular form. Unless otherwise stated, the terms "at least one" and "at least one of", when preceding a sequence of elements, are understood to refer to each of these elements. The terms "at least one" and "at least one of" include, for example, one, two, three, four or more elements.

The scope and meaning of any use of a term will be apparent from the specific context in which the term is used. Certain further definitions for selected terms used throughout this document are given in the appropriate context of the detailed description, as applicable.

The present disclosure and the underlying invention is at least in part based on the surprising finding by the inventors that the protein ITIH5 can be directly administered to and into the skin and that it can be used as an alternative to administering hyaluronic acid or a salt thereof, and that it can also be used in combination with the same. While ITIH5 has been the subject of research for years, the overall role of the protein in the skin, and in particular the biological function of ITIH5 in skin with regard to its an interaction with hyaluronic acid still needed to be identified.

In a use of ITIH5 disclosed herein and a method for the cosmetic treatment of the skin or joint of a subject using ITIH5, typically the hyaluronic acid present in the tissue of the subject to be treated, for example in its skin, is stabilised. For such an application it may be sufficient to use a solution consisting essentially of ITIH5 and water. One or more carriers may be present in such a solution that contribute to keeping ITIH5 stable in solution, for instance a buffer. In some embodiments a cream or a gel may be used. A respective gel may essentially consist of a gelling agent, e.g. a respective thickener and/or binding agent and ITIH5.

A use of ITIH5, as well as the use of a composition disclosed herein for cosmetic purposes, serves in some embodiments in rejuvenating the skin tissue of a subject. An effective amount of ITIH5 is applied to or into the skin of a subject. Where a composition disclosed herein is used for cosmetic purposes, it may be applied into or onto the skin of a subject in various ways. As an example, a corresponding solution may be administered subepidermally, i.e. intradermally or subcutaneously. This can be done by means of a conventional needle syringe or by means of the needleless syringe technology known to the skilled artisan.

Also a medical use of ITIH5, as well as the use of a composition disclosed herein for therapeutic purposes, may serve in treating skin aging, for example caused by environmental influences or as an adverse effect of a previous therapy. As a further example, a medical use of ITIH5 and/or of a composition disclosed herein may serve in treating osteoarthritis. A medical use of ITIH5 and/or of a composition disclosed herein may also serve in treating neurodermatitis. In the case of a medical use of ITIH5 and a use of a composition as disclosed herein for therapeutic purposes, an effective amount of ITIH5 is also introduced into or onto the skin of a subject.

A medical use of ITIH5, as well as a use of a composition disclosed herein for therapeutic purposes, may also serve in treating arthritic and/or arthrotic joints. Hyaluronic acid provides the viscosity and elasticity of the synovial fluid of a joint. It contributes to joint lubrication, buffers load transfer via the joint surfaces and gives the synovial fluid anti-inflammatory properties. In osteoarthritis, the molecular weight and the amount of hyaluronic acid in the synovial fluid are reduced, which affects the ability of the synovial fluid to function effectively. Stabilizing hyaluronic acid by means of ITIH5 increases the amount of hyaluronic acid present in the synovial fluid and therefore leads to a therapeutic improvement. In this context, ITIH5 is disclosed for use in the treatment or prevention of cartilage degeneration and a condition of arthrosis or arthritis. Furthermore, a formulation containing ITIH5 is disclosed for use in the treatment or prevention of cartilage degeneration and a condition of osteoarthritis or arthritis.

As already indicated above, ITIH5 and the composition containing the same, respectively, is in some embodiments topically administered to a subject. For administration to the skin, the epidermis acts as a barrier, reducing the entry of ITIH5 into intradermal and subcutaneous skin layers. Therefore, ITIH5 and the composition containing the same, respectively, is in some embodiments administered intradermally or subcutaneously. In this respect, there are various techniques available to the skilled artisan that allow transporting ITIH5 across the skin barrier. For example, an injection device or a rolling device can be used for transmucosal or transepidermal administration. A suitable minimally invasive technique is microneedling. As described, for example, by Singh and Yadav (Singh, A., Yadav, S., Indian Dermatol Online J (2016) 7, 244-254), a dermaroller containing microneedles can be used to produce minimal skin lesions in a controlled manner without damaging the epidermis. A local anaesthetic is applied in advance or at the same time. Dermarollers have been commercially available for years in different variants, as described by Singh and Yadav.

A further suitable minimally invasive technique is a laser-assisted ablative method such as ablative fractional resurfacing. In this procedure, as e.g. described by Hædersdal et al. (Hædersdal, M., et al., Lasers in Surgery and Medicine (2010) 42, 113-122), microscopic vertical holes or channels are created. These laser-generated channels allow diffusion into the surrounding dermis. Suitable laser systems, for example with a $CO_2$ laser, an Erbium laser or an Erbium:Yttrium aluminium garnet (Er:YAG) laser, are commercially available as described by Hædersdal et al. A non-sequential fractionated pulsed $CO_2$ laser may also be used, as for example disclosed by Huth et al. (Huth, S. et al., Exp Dermatol. (2016) 25, 12, 997-999).

In some embodiments the use of ITIH5 or a composition disclosed herein involves the use of a local anaesthetic. In some embodiments a composition disclosed herein contains a local anaesthetic. The composition may, for example, contain a local anaesthetic of the aminoamide type such as lidocaine or ropivacaine. Further examples of a suitable local anaesthetic of the aminoamide type are prilocaine and articaine. Bupivacaine and the S-enantiomer levobupivacaine thereof are also suitable examples of a local anaesthetic of the aminoamide type. Further examples of a suitable local anaesthetic of the aminoamide type are etidocaine and dyclonine. Dibucaine (cinchocaine) and trimecaine are also suitable examples of a local anaesthetic of the aminoamide type. In some embodiments a formulation of ITIH5 disclosed herein is provided in the form of a kit with a local anaesthetic. Such a kit contains a first container containing the formulation of ITIH5. The kit further contains a second container that contains a formulation of a local anaesthetic. In some embodiments, such a kit may furthermore include a device for injection into or through the skin, or a microperforation device for the skin.

In some embodiments, a composition disclosed herein contains a local anaesthetic of the aminoester type. The composition may, for example, contain procaine or benzocaine. Further examples of a suitable local anaesthetic of the amino ester type are 2-chloroprocaine or oxybuprocaine. Proxymetacaine (proparacaine) and tetracaine are also suitable examples of a local anaesthetic of the amino ester type. As a further example, a composition disclosed herein may contain the local anesthetic Fomocaine.

The present invention is based on the finding by the inventors that the protein ITIH5 increases the stability of hyaluronic acid and the salts thereof. For example, in the absence of ITIH5, no fiber structure was observed in the skin, as was a disorder in epidermal development and of the organization of the extracellular matrix. It was also found that the presence of recombinant ITIH5 protein inhibits oxidation of hyaluronic acid, or the sodium salt thereof, by reactive oxygen species. Furthermore, in the absence of ITIH5, significantly lower adhesion of fibroblasts to the ECM was observed. For these investigations, recombinant full-length ITIH5 was produced and isolated for the first time. Furthermore, it has been observed that an injection of recombinant ITIH5 in a skin model leads to a change in the expression pattern of genes that is comparable to the change in the expression pattern induced by an injection of hyaluronic acid preparations (FIG. 7). After adding recombinant ITIH5, differentiation genes were down-regulated in skin models. After addition of recombinant ITIH5, epidermis thickness also increased (FIG. 5).

For a medical use of ITIH5, or for a cosmetic use thereof, in some embodiments a solution of ITIH5 is employed. The solution is generally a sterile solution. In some embodiments, a respective sterile solution is provided as a sterile prefilled syringe. In some embodiments, a sterile solution of ITIH5 is provided in sterile form in an ampulla, which may be used, for example, for microneedling, e.g. for a dermal roller. In some embodiments a sterile gel or a sterile viscoelastic is provided.

In a composition disclosed herein, ITIH5 is contained in an effective amount. In some embodiments, ITIH5 is present in a composition disclosed herein in an amount sufficient to stabilize hyaluronic acid to an extent that allows improving the condition of mammalian skin, such as human skin. For example, the amount may be sufficient to allow improving hydration or elasticity of the skin.

ITIH5 is a protein chain and a member of the tissue-specific hyaluronic acid binding proteins (HABP), also called hyaladherins, with which hyaluronic acid can combine to form large complexes and thereby regulate many aspects of cell behaviour (Knudson, C. B., and Knudson W., FASEB J. (1993) 7, 1233-1241; Triggs-Raine, B., and Natowicz, M. R., World J. Biol. Chem. (2015) 6, 110-120). ITIH5 is a heavy chain of a member of the protein family of inter-α-trypsinhibitors (ITI). Among the identified HABPs, the members of this protein family are unique in that, in contrast to all other HABPs, they are covalently bound to hyaluronic acid. ITIs consist of a uniform light chain and so far six identified homologous heavy chains (ITIH1 to ITIH6) (Bost, F., et al., Eur. J. Biochem. (1998) 252, 339-346; Himmelfarb, M., et al., Cancer Lett. (2004) 204, 69-77; Zhuo, L., et al., J. Biol. Chem. (2004) 279, 38079-38082). ITIH6 (Clark H. F., et al., Genome Res. (2003) 13, 10, 2265-2270), also known as ITIH5L, of Swissprot/Uniprot accession number Q6UXX5, version 1 of the sequence of 5 Jul. 2004, version 113 of the database entry of 12 Sep. 2018, is especially expressed in the gastrocnemius muscle. The light chain is a chondroitin sulfate proteoglycan the core protein of which is called bikunin and which provides the entire molecule with a protease inhibitor function. A bikunin molecule is typically connected to one or two heavy chains via an ester bond.

Posttranslational processing of precursor ITIH proteins at a conserved cleavage site exposes a C-terminal amino acid, which allows binding to hyaluronic acid and thus aggregates to "cable-like structures" (Salier, J. P., et al., Biochem. J. (1996) 315 (Pt 1), 1-9; Zhuo et al., 2004, supra). This cross-linking of hyaluronic acid is a convincing mechanism for stabilizing the ECM. Thus, numerous findings point toward an anti-inflammatory effect of ECM complexation via the binding of ITIH to hyaluronic acid (Day, A. J., and de la Motte, C. A., Trends Immunol. (2005) 26, 637-643; Zhuo et al., 2004, supra).

In a use disclosed herein, a method disclosed herein and a composition disclosed herein, ITIH5 is usually used as a mature full-length protein. Typically this is the posttranslationally processed protein chain. As explained above, a portion of the C-terminus of the precursor chain is cleaved off of this protein chain for binding to hyaluronic acid (Huth, S., et al., Exp. Dermatol. (2015) 24, 9, 663-668; Himmelfarb et al., 2004, supra). Hyaluronic acid binds to the unmasked carboxyl group of the aspartate at the free end of the protein chain.

In some embodiments, ITIH5 is a heavy chain H5 of human inter-alpha-trypsin inhibitor (also called ITI heavy chain H5) of Swissprot/Uniprot accession number Q86UX2, version 2 of the sequence of 29 Apr. 2008, version 115 of the database entry of 12 Sep. 2018. In some embodiments, ITIH5 is a protein chain the sequence of which is substantially identical to the sequence of the preceding Swissprot/Uniprot accession number Q86UX2, version 2 of the sequence. Four isoforms are known which are in the database entry of Swissprot/Uniprot accession number Q86UX2 designated as isoform 1 (identifier: Q86UX2-1), isoform 2 (identifier: Q86UX2-2), isoform 3 (identifier: Q86UX2-3) and isoform 4 (identifier: Q86UX2-4). Compared to isoform 1 that has 942 amino acids, isoform 2 lacks amino acids 695-942, and within the preceding region of amino acids 667-694 there is a substitution. Isoform 2 thus has a length of 694 amino acids. Compared to isoform 1 that has 942 amino acids, isoform 3 lacks amino acids 1-214, and in the subsequent region of amino acids 215-218 there is a substitution. Isoform 3 thus has a length of 728 amino acids. In comparison to isoform 1, isoform 4 lacks amino acids 1-449 and 694-942. In each of the subsequent regions of amino acids 450-473 and 678-693 there is a substitution.

The protein ITIH5 used in any use or composition or method disclosed herein is, in some embodiments, isoform 1 or isoform 2 of Swissprot/Uniprot accession number Q86UX2, version 115 of the database entry of 12 Sep. 2018, based on version 2 of the sequence. In some embodiments, the protein ITIH5 has a protein chain with a sequence that is substantially identical to the sequence of isoform 1 or isoform 2 of the preceding Swissprot/Uniprot accession number Q86UX2. In some embodiments, ITIH5 is isoform 3 or isoform 4 of Swissprot/Uniprot accession number Q86UX2, version 115 of the database entry of 12 Sep. 2018. In some embodiments, the protein ITIH5 has a protein chain with a sequence that is substantially identical to the sequence of isoform 3 or isoform 4 of the preceding Swissprot/Uniprot accession number Q86UX2.

In some embodiments ITIH5 is a naturally occurring variant of the heavy chain H5 of Swissprot/Uniprot accession number Q86UX2, version 2 of the sequence dated 29 Apr. 2008, version 115 of the database entry dated 12 Sep. 2018. This database entry names variants VAR_042847, VAR_042848, VAR_042849, VAR_042850, VAR_055973, VAR_055974 and VAR_061276. In some embodiments, ITIH5 is a protein chain with a sequence that is substantially identical to the sequence of one of the preceding variants VAR_042847, VAR_042848, VAR_042849, VAR 042850, VAR 055973, VAR 055974 and VAR_061276.

In some embodiments, ITIH5 is a heavy chain H5 of murine inter-alpha-trypsin inhibitor of Swissprot/Uniprot accession number Q8BJD1, version 1 of the sequence dated 1 Mar. 2003, version 110 of the database entry dated 12 Sep. 2018. In some embodiments, ITIH5 is a protein chain the sequence of which is essentially identical to the sequence of the preceding Swissprot/Uniprot accession number Q8BJD1, version 1 of the sequence. In some embodiments, ITIH5 is a heavy chain H5 of the bovine inter-alpha-trypsin inhibitor of Swissprot/Uniprot accession number A2VE29, version 1 of the sequence of 20 Mar. 2007, version 58 of the database entry of 25 Oct. 2017. In some embodiments, ITIH5 is a protein chain the sequence of which is substantially identical to the sequence of the preceding Swissprot/Uniprot accession number A2VE29, version 1 of the sequence.

In some embodiments, ITIH5 isoform 3 is a heavy chain H5 of inter-alpha-trypsin inhibitor from rhesus monkey (*Macaca mulatta*). There are corresponding proteins of Swissprot/Uniprot accession numbers H9FIN1, version 1 of the sequence of 16 May 2012, version 16 of the database entry of 25 Oct. 2017, and H9FEW0, version 1 of the sequence of 16 May 2012, version 15 of the database entry of 30 Aug. 2017. In some embodiments, ITIH5 is a protein chain with a sequence that is essentially identical to the sequence of the preceding Swissprot/Uniprot accession numbers H9FIN1 and H9FEW0, both version 1 of the sequence.

In some embodiments, ITIH5 is a heavy chain H5 of inter-alpha-trypsin inhibitor from Sumatran orangutane (*Pongo abelii*) of Swissprot/Uniprot accession number Q5RER0, version 1 of the sequence of 21 Dec. 2004, version 51 of the database entry of 25 Oct. 2017. In some embodiments, ITIH5 is a protein chain with a sequence that is essentially identical to the sequence of the preceding Swissprot/Uniprot accession number Q5RER0, version 1 of the sequence.

In some embodiments, ITIH5 is a heavy chain H5 of inter-alpha-trypsin inhibitor from chimpanzee (*Pan troglodytes*) of Swissprot/Uniprot accession number A0A213SAG3, version 1 of the sequence of 28 Feb. 2018, version 3 of the database entry of 25 Apr. 2018. In some embodiments, ITIH5 is a heavy chain 115 of inter-alpha-trypsin inhibitor from chimpanzee (*Pan troglodytes*) of Swissprot/Uniprot accession number K7AKV0, termed isoform 2, version 1 of the sequence of 9 Jan. 2013, version 23 of the database entry of 23 May 2018. In some embodiments, ITIH5 is a heavy chain H5 of inter-alpha-trypsin inhibitor from chimpanzee (*Pan troglodytes*) of Swissprot/Uniprot accession number K7AKV0, termed isoform 3, version 1 of the sequence of 28 Mar. 2018, version 3 of the database entry of 23 May 2018. In some embodiments, ITIH5 is a heavy chain H5 of inter-alpha-trypsin inhibitor from chimpanzee (*Pan troglodytes*) of Swissprot/Uniprot accession number A0A2J8KYY5, termed isoform 5, version 1 of the sequence of 28 Mar. 2018, version 3 of the database entry of 23 May 2018. In some embodiments, ITIH5 is a heavy chain H5 of inter-alpha-trypsin inhibitor from chimpanzee (*Pan troglodytes*) of Swissprot/Uniprot accession number A0A213SUL1, termed isoform 7, version 1 of the sequence of 28 Feb. 2018, version 4 of the database entry of 23 May 2018.

In some embodiments, ITIH5 is a heavy chain H5 of inter-alpha-trypsin inhibitor from guinea pig (*Cavia porcellus*) of Swissprot/Uniprot accession number H0VH12, version 1 of the sequence of 22 Feb. 2012, version 34 of the database entry of 12 Feb. 2012. In some embodiments, ITIH5 is a protein chain the sequence of which is essentially identical to the sequence of the preceding Swissprot/Uniprot accession number H0VH12, version 1 of the sequence.

In some embodiments, ITIH5 is the isoform X3 of the heavy chain H5 of the inter-alpha-trypsin inhibitor from rat (*Rattus norvegicus*) of GenBank accession number XP_001069890, version 2 of the sequence of 2 Apr. 2010, database entry of 26 Jul. 2016. In some embodiments, ITIH5 is a protein chain with a sequence that is essentially identical to the sequence of the preceding GenBank accession number XP_001069890, version 2 of the sequence.

In some embodiments ITIH5 is a heavy chain H5 of the inter-alpha-trypsin inhibitor from gold hamster (*Mesocricetus auratus*) of Swissprot/Uniprot accession number A0A1U7Q7F4, version 1 of the sequence of 10 May 2017, version 7 of the database entry of 20 Jun. 2018. In some embodiments, ITIH5 is a protein chain with a sequence that is essentially identical to the sequence of the preceding Swissprot/Uniprot accession number A0A1U7Q7F4, version 1 of the sequence.

In some embodiments. ITIH5 is a heavy chain H5 of inter-alpha trypsin inhibitor from rabbit (*Oryctolagus cuniculus*) of Swissprot/Uniprot accession number G1TCP6, version 2 of the sequence of 13 Nov. 2013, version 34 of the database entry dated 12 Sep. 2018. In some embodiments, ITIH5 is a protein chain the sequence of which is essentially identical to the sequence of the preceding Swissprot/Uniprot accession number G1TCP6, version 2 of the sequence.

In some embodiments, ITIH5 is a heavy chain H5 of inter-alpha trypsin inhibitor from dog, which is encoded by the nucleic acid sequence with GenBank accession number XM_005617202, version 2 of the sequence of 5 Sep. 2017. This can be the protein chain with the Swissprot/Uniprot accession number F1PDN8, version 2 of the sequence dated 31 Oct. 2012, version 32 of the database entry dated 12 Sep. 2018. In some embodiments, ITIH5 is a protein chain with a sequence that is essentially identical to the sequence of the preceding Swissprot/Uniprot accession number F1PDN8, version 2 of the sequence.

In some embodiments, ITIH5 is a heavy chain H5 of inter-alpha trypsin inhibitor from cat (*Felis catus*) encoded by the nucleic acid sequence with GenBank accession number XM_011283573, version 2 of the sequence of 12 Dec. 2017. This may be the protein chain with the Swissprot/Uniprot accession number M3WEM7, version 2 of the sequence dated 28 Feb. 2018, version 33 of the database entry dated 12 Sep. 2018. In some embodiments. ITIH5 is a protein chain the sequence of which is essentially identical to the sequence of the preceding Swissprot/Uniprot accession number M3WEM7, version 2 of the sequence.

In some embodiments, ITIH5 is a heavy chain H5 of porcine (*Sus scrofa*) inter-alpha trypsin inhibitor of Swissprot/Uniprot accession number F1RUM0, version 2 of the sequence of 22 Nov. 2017, version 39 of the database entry of 12 Sep. 2018 or of Swissprot/Uniprot accession number K9J4W0, version 1 of the sequence of 6 Feb. 2013, version 21 of the database entry dated 31 Jan. 2018. In some embodiments, ITIH5 is a protein chain the sequence of which is essentially identical to the sequence of the preceding Swissprot/Uniprot accession numbers F1RUM0, version 2 of the sequence, and K9J4W0, version 1 of the sequence.

In some embodiments, ITIH5 is the full-length protein of a heavy chain H5 of inter-alpha-trypsin inhibitor as described above. Thus, ITH5 may for example be the full-length protein of isoform 1 of the human protein of Swissprot/Uniprot accession number Q86UX2, identifier: Q86UX2-1. In some embodiments, ITIH5 is a protein that contains or consists of amino acid positions 19 to 681 of the sequence of isoform 1 of Swissprot/Uniprot accession number Q86UX2, identifier: Q86UX2-1, version 2 of the sequence of 29 Apr. 2008, version 115 of the database entry of 12 Sep. 2018, corresponding to amino acid positions 19 to 681 of Genbank accession No NP_085046, version 5 of the sequence, database entry of 15 Jun. 2018. In some embodiments, ITIH5 is a protein that contains or consists of a sequence that is essentially identical to amino acid positions 19 to 681 of isoform 1 of Swissprot/Uniprot accession number Q86UX2, identifier: Q86UX2-1, version 2 of the sequence of 29 Apr. 2008, version 115 of the database entry of 12 Sep. 2018. In some embodiments, ITIH5 is a protein that contains or consists of a sequence that is essentially identical to amino acid positions 295 to 681 of isoform 1 of Swissprot/Uniprot accession number Q86UX2 (identifier: Q86UX2-1). In some embodiments, ITIH5 is a protein that contains or consists of amino acid positions 17 to 681 of the sequence of isoform 1 of Swissprot Uniprot accession number Q86UX2, version 2 of the sequence of 29 Apr. 2008, corresponding to amino acid positions 17 to 681 of Genbank accession No NP_085046, version 5 of the sequence (cf. above). In some embodiments, ITIH5 is a protein that contains or consists of a sequence that is essentially identical to amino acid positions 17 to 681 of isoform 1 of said Swissprot/Uniprot accession number Q86UX2, identifier: Q86UX2-1.

In some embodiments, ITIH5 is a protein that contains or consists of a sequence that corresponds to the amino acid positions 19 to 681 of the sequence of isoform 1 of Swissprot/Uniprot accession number Q86UX2. In some embodiments, ITIH5 is a protein that contains or consists of a sequence that corresponds to the amino acid positions 17 to 681 of isoform 1 of Swissprot/Uniprot accession number Q86UX2. In some embodiments, ITIH5 is a protein that contains or consists of a sequence that corresponds to amino acid positions 295 to 681 of isoform 1 of Swissprot/Uniprot accession number Q86UX2.

In some embodiments, ITIH5 is a protein that contains or consists of amino acid positions 1 to 681 of the sequence of isoform 1 of said Swissprot/Uniprot accession number Q86UX2. In some embodiments, ITIH5 is a protein that contains or consists of a sequence that is essentially identical to amino acid positions 1 to 681 of isoform 1 of said Swissprot/Uniprot accession number Q86UX2.

In some embodiments, ITIH5 is a protein that is encoded by a nucleic acid sequence that contains or essentially consists of base positions 130 to 2117 of the sequence of the ITIH5 mRNA of GenBank accession No NM_030569.7, version 7 of the sequence, database entry as of 22 Nov. 2018. In some embodiments, ITIH5 is a protein that is encoded by a nucleic acid sequence that contains or essentially consists of base positions 75 to 2117 of the sequence of GenBank accession No NM_030569.7, version 7 of the sequence (supra). In some embodiments, ITIH5 is a protein that is encoded by a nucleic acid sequence that contains or essentially consists of base positions 1 to 2043 of the sequence of the ITIH5 mRNA of GenBank accession No NM_030569.7, version 7 of the sequence. In some embodiments, ITIH5 is a protein that is encoded by a nucleic acid sequence that contains or essentially consists of base positions 49 to 2043 of the sequence of said GenBank accession No NM_030569.7. In some embodiments, ITIH5 is a protein that is encoded by a nucleic acid sequence that contains or essentially consists of base positions 58 to 2045 of the sequence of the ITIH5 mRNA of GenBank accession No AY238437.1, version 1 of the sequence, database entry of 11 Mar. 2010. In some embodiments, ITIH5 is a protein that is encoded by a nucleic acid sequence that contains or essentially consists of base positions 3 to 2045 of the sequence of said GenBank accession No AY238437.1. In some embodiments, ITIH5 is a protein that is encoded by a nucleic acid sequence that contains or essentially consists of base positions 3 to 2043 of the sequence of GenBank accession No AY238437.1.

In some embodiments, ITIH5 is a protein that is encoded by a nucleic acid sequence that contains or essentially consists of base positions 107 to 2139 of the sequence of the ITIH5 mRNA of GenBank accession No NM_001001851, version 2 of the sequence, database entry of 24 Jun. 2018. In some embodiments, ITIH5 is a protein that is encoded by a nucleic acid sequence that contains or essentially consists of base positions 162 to 2139 of the sequence of said GenBank accession No NM_001001851. In some embodiments, ITIH5 is a protein that is encoded by a nucleic acid sequence that contains or essentially consists of base positions 51 to 2045 of the sequence of the ITIH5 mRNA of GenBank accession NoNM_030569.7, version 7 of the sequence, database entry of 15 Jun. 2018. In some embodiments, ITIH5 is a protein that is encoded by a nucleic acid sequence that contains or essentially consists of base positions 3 to 2045 of the sequence of said GenBank accession NoNM_030569.7.

In some embodiments, ITIH5 is a protein that contains or consists of amino acid positions 18 to 681 of the sequence of heavy chain H5 of murine inter-alpha-trypsin inhibitor of Swissprot/Uniprot accession number Q8BJD1, version 1 of the sequence dated 1 Mar. 2003, version 110 of the database entry dated 12 Sep. 2018. In some embodiments, ITIH5 is a protein that contains or consists of amino acid positions 1 to 681 of the sequence of said Swissprot/Uniprot accession number Q8BJD1. In some embodiments, ITIH5 is a protein that contains or consists of a sequence that is essentially identical to amino acid positions 1 to 681 of isoform 1 of said Swissprot/Uniprot accession number Q8BJD1.

In some embodiments, ITIH5 is a protein that contains or consists of amino acid positions 18 to 681 of the sequence of isoform X1 of heavy chain H5 of murine inter alpha-trypsin inhibitor of GenBank/GenPept accession number XP_006497498, version 1 of the sequence dated 27 Dec. 2013, database entry dated 22 Jun. 2016. In some embodiments, ITIH5 is a protein that contains or consists of a sequence that is essentially identical to amino acid positions 1 to 681 of isoform 1 of said GenBank/GenPept accession number XP_006497498.

ITIH5 is producible according to standard processes known to skilled artisan. The ITIH5 protein used in a formulation may, for example, be expressed in CHO cells or HEK cells and purified by one or more chromatography steps. For example, in an area of the ITIH5 precursor protein that is cleaved during maturation, an affinity tag can be provided on the basis of which affinity chromatography may be performed. As a further example, the mature form of the ITIH may be expressed and purified by a sequence of chromatography steps.

Provided is inter alia a liquid aqueous pharmaceutical formulation consisting of a therapeutically and/or cosmetically effective amount of ITIH5 in a buffered solution. In some embodiments a liquid aqueous pharmaceutical formulation is provided consisting of ITIH5 and a therapeutically and/or cosmetically effective amount of hyaluronic acid in a buffered solution. In some embodiments a liquid aqueous pharmaceutical formulation is provided which consists of a therapeutically and/or cosmetically effective amount of ITIH5 and a therapeutically and/or cosmetically effective amount of hyaluronic acid in a buffered solution.

Provided is also a liquid aqueous pharmaceutical formulation containing a therapeutically and/or cosmetically effective amount of ITIH5 in a buffered solution. In some embodiments, a liquid aqueous pharmaceutical formulation is provided, which contains ITIH5 and a therapeutically and/or cosmetically effective amount of hyaluronic acid in a buffered solution. In some embodiments a liquid aqueous pharmaceutical formulation is provided, which contains a therapeutically and/or cosmetically effective amount of ITIH5 and a therapeutically and/or cosmetically effective amount of hyaluronic acid in a buffered solution.

A composition disclosed herein is in some embodiments free from hyaluronic acid. In some embodiments a composition disclosed herein contains hyaluronic acid. Typically, the hyaluronic acid is at least essentially unbranched hyaluronic acid. In some embodiments branched hyaluronic acid is also included in the composition. In some embodiments branched hyaluronic acid is not detectable. In some embodiments, a composition disclosed herein contains hyaluronic acid at a concentration of 2 mg/ml or more, including 4 mg/ml or more. In some embodiments, a composition disclosed herein contains hyaluronic acid at a concentration of 5 mg/ml or more, such as 7.5 mg/ml or more. A composition disclosed herein may also contain hyaluronic acid at a concentration of 10 mg/ml or more, including a concentration of 12.5 mg/ml or more. In some embodiments, a composition disclosed herein contains hyaluronic acid at a concentration of 15 mg/ml or more, including 17.5 mg/ml or more. In some embodiments, a composition disclosed herein may contain hyaluronic acid at a concentration of 20 mg/ml or more, for example at a concentration of 22.5 mg/ml or more.

In some embodiments where the composition contains hyaluronic acid, the latter has a molecular weight of 500 kD or more, such as 700 kD or more. In some embodiments the composition contains hyaluronic acid having a molecular weight of 800 kD or more, including e.g. 1000 kD or more. The composition may also contain hyaluronic acid that has a molecular weight of 1200 kD or more, such as 1500 kD or more. In some embodiments, the hyaluronic acid contained in the composition may have a molecular weight of 1700 kD or more, such as a molecular weight of 2000 kD or more. In some embodiments, the hyaluronic acid contained in the composition has a molecular weight of 2500 kD or more, such as 2800 kD or more. The hyaluronic acid contained in the composition may in some embodiments have a molecular weight of 3000 kD or more, such as 3500 kD or more. In some embodiments, the hyaluronic acid contained in the composition may have a molecular weight of 4000 kD or more, such as 4200 kD or more. In some embodiments, the hyaluronic acid contained in the composition has a molecular weight of 4500 kD or more, such as 5000 kD or more.

In some embodiments, hyaluronic acid or a salt thereof is present in a composition disclosed herein in an amount sufficient to improve the condition of mammalian skin, such as human skin. For example, the amount may be sufficient to improve hydration or elasticity of the skin.

In some embodiments, a composition disclosed herein contains biocompatible microparticles, for example ceramic/glass, as described in WO 2008/031194. A composition disclosed herein typically contains a physiologically and pharmaceutically acceptable buffer compound. Such a buffer compound may, for example, be present in the range of up to 2% by weight of the composition. An example of a suitable buffer compound is a phosphate buffer, for example a sodium phosphate buffer. Another suitable buffer compound is a borate buffer, for example a sodium borate buffer. Another suitable buffer compound is Tris (tris(hydroxymethyl)-aminomethane).

A composition disclosed herein exists in some embodiments in liquid form, for example as a gel, as a cream, as a lotion, as a serum or as a spray.

A composition disclosed herein may contain one or more other complementary ingredients such as vitamin A, a carotenoid, beta-carotene, vitamin D, a tocopherol, tocopheryl acetate, vitamin K, vitamin C, thiamine, riboflavin, niacin, vitamin B6, vitamin B12, pantothenic acid, folic acid, biotin, coenzyme Q10, idebenone, zinc, copper, retinol, a peptide, and/or an alpha-hydroxy acid such as citric acid, lactic acid or malic acid. A composition disclosed herein may also contain a beta-hydroxy acid, azelaic acid, ursolic acid, oleanolic acid and/or 4-butylresorcinol.

As yet further examples, a composition disclosed herein may include a lactate, urea, glycerol, propylene glycol, 1,2-pentanediol, 1,2-hexanediol and/or 1,2-octanediol. A composition disclosed herein may also contain collagen, elastin, diacyladipate, petrolatum, urocanic acid, lecithin, allantoin, panthenol, phytantriol and/or lycopene. A composition disclosed herein may also contain a ceramide and/or a pseudo-ceramide. As an example, such a composition may contain C2 ceramide (N-acetoyl-D-erythro-sphingosine). A composition disclosed herein may also contain hydroxypropylbispalmitamide MEA, cetyloxypropylglyceryl-methoxypropylmyristamide, N-(1-hexa-decanoyl)-4-hydroxy-L-proline (1-hexadecyl) ester and/or hydroxyethylpalmityl oxyhydroxy-propylpalmitamide. A composition disclosed herein may also contain a glycosphingolipid, cholesterol, a phytosterol, chitosan and/or chondroitin sulphate.

A composition disclosed herein may also contain one or more cosmetically and/or pharmaceutically acceptable excipients or vehicles. Numerous excipients and vehicles are common in cosmetics, which may be present, such as humectants, preservatives, antioxidants, complexing agents, solvents, fragrances, bactericides, odour absorbers, vitamins, self-tanning and anti-wrinkle agents. Such excipients may be present in usual quantities, e.g. from 0.01% to 20% of the total weight of the composition.

The choice of the respective carrier depends essentially on which other ingredients are contained in the composition. Ingredients with lipophilic or amphiphilic solubility properties require the addition of solubilizing carriers. Examples of suitable carriers are a glycol, an alkyl or alkenyl alcohol, an aliphatic ester, a polyethylene glycol ester and a polyethylene glycol ether.

Depending on the type of excipient, an excipient may be introduced into a fat phase/lipophilic phase, into an aqueous phase and/or in the form of, or via, lipid vesicles. Further excipients suitable for use, for example, with a gel within the meaning of this disclosure are, for example, water-soluble or water-miscible solvents or co-solvents. If lipophilic substances are included in the composition, oil-soluble or oil miscible solvents or co-solvents may also be expedient.

Compounds that are employed when providing an aqueous solution are also called excipients. Illustrative examples are 0.9% saline solution, buffered saline solution or physiologically tolerable buffers. The composition may be sterilized using conventional techniques. An aqueous solution obtained may be packaged for use or filtered and freeze-dried under aseptic conditions; wherein a freeze-dried preparation is generally dissolved in a sterile aqueous solution before administration.

In some embodiments, a composition disclosed herein may furthermore contain growth factors such as TGF-alpha, EGE, KGF, bFGE, SCE, ET-1, IGF-1 as well as combinations thereof. In some embodiments a composition disclosed herein may also contain sodium copper chlorophylline complex, sodium isochlorine e4, oxidized sodiumisochlorine e4, sodium copper isochlorine e4, oxidized sodium copperisochlorine e4, sodiummagnesiumisochlorine e4 and/or oxidized sodium magnesium isochlorine e4 or a water-soluble salt thereof. Sodium copper chlorophylline complex, also known as sodium copper chlorophylline complex, copper chlorophylline complex and copper chlorophylline (abbreviated "CHLcu") refers to a complex of water-soluble copper porphyrin compounds containing one or more of sodium isochlorine e4, oxidized sodium isochlorine e4, sodium copper isochlorine e4 and/or oxidized sodium copper isochlorine e4. Further details can be found in international patent application WO 2017/027177, which also deals with the stabilizing effect of such complexes on hyaluronic acid.

As already indicated above, in some embodiments of a use disclosed herein, a composition disclosed herein or a method disclosed herein, ITIH5 may be present in a composition in liquid form, e.g. as a gel, as a cream, as a lotion, as a serum or as a spray, and ITIH5 may be present in liquid form, e.g. as a gel, a cream, a lotion, a serum or a spray. A respective composition may be injectable. In some embodiments, a respective composition is provided as a component of a patch or tape or other solid dosage form.

Due to its stabilizing properties with respect to hyaluronic acid and salts thereof, ITIH5 can be employed in numerous cosmetic and therapeutic uses and methods in which hyaluronic acid has been used so far. In some embodiments ITIH5 may be used to stabilize endogenous hyaluronic acid and/or a salt thereof. In some embodiments a combination of hyaluronic acid and ITIH5 may be used. ITIH5 may serve in stabilizing "exogenous" hyaluronic acid and/or a hyaluronic acid salt concurrently or with a delay in time. ITIH5 may also serve in stabilizing endogenous hyaluronic acid and/or a salt thereof. In this context, it should be noted that the endogenous and "exogenous" hyaluronic acid and hyaluronic acid salts can structurally at best differ in their molecular weight, however, they are principally identical molecules.

Cosmetic and therapeutic uses and methods in which so far hyaluronic acid or a salt thereof have been used and in which also either ITIH5 alone or a combination of ITIH5 and hyaluronic acid and/or a salt thereof may be used include, for example, skin care, or treatment or prevention of alterations associated with skin ageing. Similarly, skin care, or treatment or prevention of dry and/or rough skin, may include using either ITIH5 alone or a combination of ITIH5 and hyaluronic acid and/or a salt thereof.

ITIH5 or a combination of ITIH5 and hyaluronic acid may also be used in wound treatment and, for example be used to reduce scarring. In the course of foetal wound healing, which is scar-free, hyaluronic acid is present at high levels. In wound healing at a later adult stage, which is often characterized by scarring, hyaluronic acid levels are, however, reduced. This is in fact one of the main differences between foetal wounds and adult wounds. Administration of glucocorticoids such as hydrocortisone, which is used in the treatment of e.g. adrenocortical insufficiency, adrenogenital syndrome, high blood calcium, thyroiditis, rheumatoid arthritis, dermatitis, asthma and COPD, leads to reduced level of hyaluronic acid in the skin. ITIH5 or a combination of ITIH5 and hyaluronic acid and/or a salt thereof may therefore be used to treat this adverse effect, possibly after termination of the respective therapy, in order to compensate for the reduced hyaluronic acid levels.

Disclosed is furthermore a therapeutic use of an inhibitor or binding reagent for ITIH5. A respective binding reagent may be an immunoglobulin, an immunoglobulin fragment or a proteinaceous binding molecule with antibody-like functions capable of specifically binding to ITIH5. A respective binding reagent may also be a T cell receptor or a chimeric antigen receptor (CAR, also termed chimeric immunoreceptor). Such a binding molecule may furthermore for instance be or include an EGF-like domain, a Kringle domain, a fibronectin type I domain, a fibronectin type II domain, a fibronectin type III domain, a PAN domain, a Gla domain, a SRCR domain, a Kunitz/Bovine pancreatic trypsin Inhibitor domain, tendamistat, a Kazal-type serine protease inhibitor domain, a Trefoil (P-type) domain, a von Willebrand factor type C domain, an Anaphylatoxin-like domain, a CUB domain, a thyroglobulin type I repeat, an LDL-receptor class A domain, a Sushi domain, a Link domain, a Thrombospondin type I domain, an immunoglobulin domain or a an immunoglobulin-like domain (for example a domain antibody or a camel heavy chain antibody), a C-type lectin domain, a MAM domain, a von Willebrand factor type A domain, a Somatomedin B domain, a WAP-type four disulfide core domain, a F5/8 type C domain, a Hemopexin domain, an SH2 domain, an SH3 domain, a Laminin-type EGF-like domain, a C2 domain, a "Kappabody" (Ill. et al., Protein Eng (1997) 10, 949-957), a "Minibody" (Martin et al., EMBO J (1994) 13, 5303-5309), a "Diabody" (Holliger et al., PNAS U.S.A. 90, 6444-6448 (1993)), a "Janusin" (Traunecker et al., EMBO J (1991) 10, 3655-3659 or Traunecker et al., Int J Cancer (1992) Suppl 7, 51-52), a nanobody, an adnectin, a tetranectin, a microbody, an affilin, an affibody or an ankyrin, a crystallin, a knottin, ubiquitin, a zinc-finger protein, an autofluorescent protein, an ankyrin or ankyrin repeat protein or a leucine-rich repeat protein.

A respective inhibitor and a respective binding reagent of ITIH5, respectively, may be used to locally reduce the physiologically available amount of ITIH5. This can be expedient in the treatment of dermatitis. Treatment may be, for instance, of allergic contact dermatitis. The inventors have observed that in the absence of ITIH5 a significantly reduced inflammatory reaction occurred, and ITIH5 thus plays an important role in inflammatory reactions. By administering an anti-ITIH5 binding reagent, such as an anti-ITIH5 immunoglobulin or an anti-ITIH5 chimeric immunoreceptor, an inflammatory response can therefore be reduced.

Inorganic and organic chemicals cause allergic contact dermatitis, an inflammatory skin disease caused by the immune system, in many people on repeated skin contact. In a mouse model for contact hypersensitivity (CHS), the equivalent of allergic contact dermatitis in mice, the inventors surprisingly found that ITIH5 plays a role in the sensitization phase of this skin disease.

Disclosed is furthermore a method for identifying a compound candidate for stabilizing hyaluronic acid and/or a salt thereof. The method includes contacting a compound to be tested with ITIH5 and hyaluronic acid under oxidizing conditions. The method further includes after a predetermined time interval determining the molecular weight of the hyaluronic acid and/or the salt thereof. The method also includes after the predetermined time interval comparing the molecular weight of the hyaluronic acid and/or the salt thereof with the molecular weight of hyaluronic acid and/or a salt thereof in a reference sample, which did not include a compound for stabilizing hyaluronic acid and/or a salt thereof. If the molecular weight of the hyaluronic acid and/or the salt thereof, after the predetermined time interval, is detected to be higher than in the reference sample, which did not include a compound for stabilizing hyaluronic acid and/or a salt thereof, the compound to be tested is classified as a candidate compound for stabilizing hyaluronic acid and/or a salt thereof. If the molecular weight of the hyaluronic acid and/or the salt thereof, after the predetermined time interval, is detected to be the same of lower than in the reference sample, which did not include a compound for stabilizing hyaluronic acid and/or a salt thereof, the compound to be tested is classified as not being a candidate compound for stabilizing hyaluronic acid and/or a salt thereof. If the molecular weight of the hyaluronic acid, after the predetermined time interval, is higher than in the reference sample, this allows the indirect conclusion that the compound to be tested is a candidate to enhance the stabilizing effect of ITIH5 on hyaluronic acid.

In some embodiments, a compound to be tested may be contacted with ITIH5 and hyaluronic acid (and/or a salt thereof) under oxidizing conditions within a range of different concentrations of the same compound. In some embodiments, the step of contacting a compound to be tested with ITIH5 and hyaluronic acid (and/or a salt thereof) under oxidizing conditions may be repeated within a range of different concentrations of the compound. In some embodiments, the compound to be tested may be classified as a candidate compound for enhancing the effect of ITIH5 in stabilizing hyaluronic acid and/or a salt thereof when, after the predetermined time interval, within the range of concentrations for the compound to be tested, the detected molecular weight of the hyaluronic acid and/or the salt thereof is higher than in the reference sample.

In some embodiments, a range of predetermined time intervals may be defined for which a compound to be tested is kept in contact with ITIH5 and hyaluronic acid (and/or a salt thereof) under oxidizing conditions. In some embodiments, the step of contacting a compound under test with ITIH5 and hyaluronic acid under oxidizing conditions may be repeated within a range of different time intervals for which a compound to be tested is left in contact with ITIH5 and hyaluronic acid under oxidizing conditions. In some embodiments, the compound to be tested may be classified as a candidate for enhancing the stabilizing effect of ITIH5 on hyaluronic acid or a salt thereof when, in the range of predetermined time intervals for keeping the compound to be tested in contact with ITIH5 and hyaluronic acid (and/or the salt thereof) under oxidizing conditions, the molecular weight of the hyaluronic acid or salt thereof is higher than in the reference sample.

Article of Manufacture

In a further aspect, an article of manufacture such as a kit is provided. The article of manufacture includes matter, e.g. material, useful for (i) the treatment, prevention of delay of skin aging, wrinkled skin, rough skin, dry and rough skin, acne, acne scar, skin atrophy and/or pressure ulcer; (ii) the treatment, prevention of delay of an arthritic and/or arthrotic joint or arthrotic changes of a joint (iii) treating a subject suffering from reduced hyaluronic acid or (iv) cosmetic purposes. The article of manufacture may include instructions for use and one or more containers. Suitable containers include, for example, bottles, vials, syringes, cartridges, plates and test tubes and may be made from a variety of materials such as glass or plastic. At least one container holds a composition that includes ITIH5. The container may in some embodiments have a sterile access port. A respective container is typically labelled.

The reagents may for example provided in predetermined amounts of dry powders, usually lyophilized, including excipients which after dissolution will provide a reagent solution having the appropriate concentration. Other additives such as stabilizers and/or buffers may also be included.

The instructions for use may provide indications that the composition is used for the treatment, prevention and/or delay of progression of a disorder of choice; or instructions for performing a cosmetic use. The instructions may be provided on a label and/or on a package insert.

All patent applications, websites, other publications, accession numbers cited above or below are incorporated by reference in their entirety for all purposes to the same extent as if each individual item were specifically and individually indicated to be so incorporated by reference. In case of conflict, the present specification, including definitions, will prevail. If two or more documents incorporated by reference include conflicting and/or inconsistent disclosure with respect to each other, then the document having the later effective date shall control. If different versions of a sequence are associated with an accession number at different times and no particular date or version is cited, the version associated with the accession number at the effective filing date of this application is meant. The effective filing date means the earlier of the actual filing date or filing date of a priority application referring to the accession number if applicable. Likewise, if different versions of a publication or website are published at different times, the version most recently published at the effective filing date of the application is meant unless otherwise indicated.

While there are shown and described presently preferred embodiments of the invention, it is to be understood that the invention is not limited thereto but may be otherwise variously embodied and practiced within the scope of the following claims. Since numerous modifications and alternative embodiments of the present invention will be readily apparent to those skilled in the art, this description is to be construed as illustrative only and is for the purpose of teaching those skilled in the art the best mode for carrying out the present invention. Accordingly, all suitable modifications and equivalents may be considered to fall within the scope of the following claims.

The present invention is directed to each individual feature, system, article, material, kit, and/or method described herein. In addition, any combination of two or more such features, systems, articles, materials, kits, and/or methods, if such features, systems, articles, materials, kits and/or methods are not mutually inconsistent, is included within the scope of the present invention.

Any feature, step, element, embodiment, or aspect as described herein can be used in combination with any other unless specifically indicated otherwise. Although the embodiments are described in some detail by way of illustration and example for purposes of clarity and understanding, it will be apparent that certain changes and modifications may be practiced within the scope of the appended claims.

While embodiments of the invention have been illustratively described, it is to be understood that the invention is not limited thereto but may be otherwise variously embodied and practiced within the scope of the appending claims. The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the appending claims. In addition, where features or aspects of the invention are described in terms of Markush groups, those skilled in the art will recognize that the invention is also thereby described in terms of any individual member or subgroup of members of the Markush group.

EXAMPLES

The following are examples, illustrating the methods and uses disclosed herein, including in conjunction with a composition as disclosed herein. It is understood that various other embodiments may be practiced, given the general description provided above. Described are inter alia the extraction and isolation of recombinant murine ITIH5. An ITIH5 protein of another species, for example human ITIH5, can be obtained accordingly.

Unless otherwise indicated, established methods were used in cell culture and for recombinant genetic material.
Materials and Processes
Mice Itih5$^{-/-}$ mice, generated on BALB/c basis, were established by TaconicArtemis (Cologne, Germany) as previously described (Huth, et al., 2015, supra). All animal procedures and experiments were conducted in accordance with the German federal law regarding the protection of animals. The protocols were approved by the administration of the "Landesamt für Umwelt, Natur und Verbraucherschutz" (LANUV, Recklinghausen, Germany).
Murine Cells and Cell Culture Isolation and cultivation of epidermal keratinocytes and dermal fibroblasts from mice were performed as previously described (Huth et al., 2015, supra).
Murine Skin Equivalents Murine 3D-skin models were prepared as previously described (Huth et al., 2015, supra). In brief, bovine collagen gels were polymerized, supplemented with confluent mouse dermal fibroblasts and allowed to grow over a period of 3 days. Subsequently, keratinocytes were seeded onto the gel surface and further cultured for 3 days in Derma Life K (Life Line Cell Technology). On the following day, the skin equivalents were lifted to the air-liquid interface and cultivated for 7 days.
Human 3D Skin Models Human 3D skin models were produced in accordance with the murine skin models. Human keratinocytes and fibroblasts were used. In brief, bovine collagen gels were polymerized and loaded with confluent human skin fibroblasts that were allowed to grow over a period of 3 days. Keratinocytes were then applied to the gel surface and cultivation was further continued for 3 days. On the following day, the skin equivalents were lifted to the air-liquid interface and cultured for 7 days. On day 8 of cultivation, 12 µl of ITIH5 protein (concentration: 1 µg/ml) were injected into the models by means of a syringe. After 5 additional days, the models were harvested and H&E staining of the cross-sections was performed.
Stable ITIH5 Knockdown in NHDF Cells NHDF cells were transduced with MISSION™ Lentiviral Transduction Particles from target set SHVRS-NM_001001851, which contained the following Clone IDs: TRCN0000118262 (shRNA #1), TRCN0000118263 (shRNA #2), TRCN0000118264 (shRNA #3), TRCN0000118265 (shRNA #4), TRCN0000118266 (shRNA #5) (Sirion Biotech GmbH, Munich, Germany). Each of the Lentiviral vectors expressed a particular shRNA targeting human ITIH5 mRNA (NM_001001851). Stable shRNA-expressing cells were generated by a 10 days selection in 0.5 µg/ml puromycin followed by 5 days of bulk-selection in 0.25 ng/ml puromycin containing growth medium. As controls, NHDF cells were transduced with lentiviral Nontarget (NT) ctrl particles (SHC002V).

To verify the knockdown, ITIH5 mRNA expression of the five mass-selected NHDF cells, in comparison to control cells was quantified by qRTPCR using an ABI PRISM 7000 Sequence Detection System (Applied Biosystems).
RNA Isolation from Murine and Human Skin Models and qRT-PCR Total RNA was isolated using the "high-pure RNA isolation kit" (Roche, Mannheim, (Germany) according to the manufacturer's instructions. The RNA was quantified by means of photometric measurement (Nanodrop, Erlangen, Germany) and the integrity was verified using the 2100 Bioanalyzer (Agilent Technologies, Palo Alto, CA, USA). Purified RNA was transcribed with the "TaqMan Reverse Transcription Reagents kit" (Applied Biosystems, Weiterstadt, Germany) using random hexamers as primers. Taq Man experiments were performed on an ABI PRISM 7000 Sequence Detection System (Applied Biosystems) using Assay-on-Demand gene expression products for Car4 (Mm00483021_m1), Postn (Mm01284919_m1), Mmp19 (Mm00491296_m1), Lce3a (Mm02763895_s1), Rptn (Mm00485857_m1), Krt10 (Mm03009921_m1), Lor (Mm01219285_m1) according to the manufacturer's recommendations. An Assay-on-Demand product for Hprt rRNA (Mm00446968 m1) was used as an internal reference to normalize the target transcripts.
Analysis of Gene Expression in Murine Skin Models Using Exon-Expression Arrays Purified mRNA was processed using the GeneChip® Whole Transcript (WT) Sense Target Labelling Assay (Affymetrix, Inc., Santa Clara, CA, USA) according to the manufacturer's recommendations. The "RiboMinus Human/Mouse Transcriptome Isolation Kit" (Invitrogen, Carlsbad, CA, USA) was used to generate purified sense strand cDNA with incorporated dUTP according to the technical manual. Hybridization was performed to GeneChip® Mouse Gene 2.0 ST array. Arrays were scanned with the "Affymetrix GeneChip® Scanner 3000 7G" controlled by the GeneChip® Operating Software (GCOS, version 1.4) to generate CEL intensity files. Expression values of Itih5$^{-/-}$ skin models were compared to WT controls using GeneSpring GX software version 13.1.1 (Agilent Technologies, Böblingen, (Germany). Gene ontology analysis was generated using http://www.gene-ontology.org/.
Analysis of Gene Expression in Human Skin Models Using Exon-Expression Arrays Purified mRNA was processed using the GeneChip® Whole Transcript (WT) Sense Target Labelling Assay (Affymetrix, Inc., Santa Clara, CA, USA) according to the manufacturer's recommendations. The "RiboMinus Human/Mouse Transcriptome Isolation Kit" (Invitrogen, Carlsbad, CA, USA) was used to generate purified sense strand cDNA with incorporated dUTP according to the technical manual. Hybridization was performed to GeneChip® Mouse Gene 2.0 ST array. Arrays were scanned with the "Affymetrix GeneChip® Scanner 3000 7G" controlled by the GeneChip® Operating Software (GCOS, version 1.4) to generate CEL intensity files. Expression values of ITIH5-treated and untreated skin models were evaluated and compared using "GeneSpring GX" software (Agilent Technologies, Böblingen, (Germany, version 14.9).
Immunohistochemistry Van Gieson staining was performed with the "Elastica van Gieson staining kit" (Merck, Darmstadt, Germany) according to the manufacturer's recommendations. In brief, paraffin-embedded 4 µm sections of each model were deparaffinized in a descending alcohol series (100%, 96%, 70%) and incubated for 10 min in elastin. Sections were thereafter washed in tap water and incubated for 5 min in Weigert's solution, washed again in tap water and then incubated for 2 min in a picrofuchsin solution. The sections were drained in a graded alcohol series (70%, 90% and 100%) and clarified with xylene. Finally, the profiles were mounted with cover glasses. Examination and photo documentation were performed using an inverse photomicroscope (LEICA DMIL, Wetzlar, Germany).

Immunofluorescence

Cryo sections of the murine skin model of 4 µm thickness were fixed in acetone for 10 minutes and air dried at 4° C. Sections were incubated with 25 µg/ml of a biotinylated hyaluronan binding protein (bHABP; Merck, Darmstadt, Germany). Subsequently, slides were washed three times for 10 min with PBS followed by incubation for 1 hour with secondary FITC-conjugated goat anti-mouse antibody (Alexa 546, Invitrogen), diluted 1:200 in Antibody Diluent (Dako). Slides were washed three times with PBS, stained with DAPI (Applichem, Darmstadt, Germany), again washed with PBS and coverslipped with fluorescent mounting medium (Dako).

Cell Adhesion Assay

Six-well plates were coated with the sodium salt of hyaluronic acid (100 µg/ml; Sigma-Aldrich) and cells ($3 \times 10^5$ cells/well) were incubated to adhere on surface for 30 min at 37° C. Attached cells were fixed with 70% ethanol for 10 min and stained with 0.1% crystal violet. After 20 min cells were thoroughly washed with water and dried overnight. The dye was dissolved in 0.002% Triton X-100 in 100% isopropanol and transferred into a 96-well plate to measure the optical density at 590 nm using an ELISA reader (SpectraMax 340, Molecular Devices, CA, USA).

Western Blot

Western blot analysis was performed as previously described (Huth et al., 2015, supra) using a customized ITIH5 antibody corresponding to the C-terminus ($NH_2$-Cys-Tyr-Leu-Ala-Ser-His-Pro-Phe-Asp-Thr-Gly-Met-Thr-Leu-Gly-Arg-Gly-Met-Ser-Arg-Glu-Leu-COOH, SEQ ID NO: 1) of the human ITIH5 protein (Pineda, Berlin, Germany). A uniform protein loading was monitored by using β-actin specific antibody.

Murine Recombinant Itih5

Murine recombinant Itih5 protein was produced by transient transfecting human embryo kidney (HEK-293) cells with a FLAG-tagged Itih5 expression vector (Applied Biological Materials Inc, Richmond, Canada) using FuGENE® HD (Promega, Mannheim, Germany) according to the manufacturer's recommendations. Purification from the supernatant was carried out with "ANTI-FLAG® M2 Affinity Gel" (Sigma-Aldrich) according to the manufacturer's recommendations. The concentrations of recombinant Itih5 were assessed with a BCA protein assay (Thermo Scientific, Rockford, IL, USA).

HA Degradation Assay

For degradation of hyaluronic acid, generation of ROS was induced by the $Cu(II)/H_2O_2$ system as described previously (Esser P R, et al., PLoS One (2012) 7, e41340). In brief, ROS generation was induced by incubation of 0.1 M $NaH_2PO_4$ (Merek) pH 7.4 containing 50 mM $CuSO_4$ (Sigma-Aldrich) with 100 mM $H_2O_2$ (Carl Roth, Karlsruhe, Germany). Different concentrations of a human recombinant ITIH5 protein were added to 20 µg high molecular weight (HMW-) hyaluronic acid (sodium salt, Calbiochem) and ROS-inducing reagents for 1 h at room temperature. Samples were were analyzed by electrophoresis in a 7% polyacrylamide gel and visualized by overnight staining with 0.005% "Stains-All" dye (Sigma-Aldrich) in 50% ethanol.

CHS Mouse Model

To induce contact hypersensitivity (CHS), WT or Itih5$^{-/-}$ mice were sensitized by application of 100 µl TNCB (3% w/v) or the respective volume of acetone as vehicle control on the shaved abdomen of 5 mice per group. Ear thickness was measured on day 5 with a thickness gauge (HITEC Messtechnik GmbH, Magstadt, Germany) and contact allergy in mice was triggered by administration of 20 µl TNCB (1%) or acetone to the cars. 24 h later the increase in car thickness was measured.

Adoptive CHS

WT or Itih5$^{-/-}$ mice were sensitized by painting the shaved abdominal skin with either 100 µl of 3% TNCB or acetone as solvent control and both ears with 20 µl of 3% TNCB or acetone. Auricular, axillary, maxillary and superficial inguinal lymph nodes were harvested 5 days later. Single cell suspensions were prepared and $1 \times 10^6$ lymph node cells were injected i.v. into naive WT recipient mice. Thickness of both ears of the recipients was measured 24 h after the adoptive cell transfer prior to painting with 20 µl 1% TNCB. Increase in ear swelling was measured 24 hours after challenge.

Statistical Analysis

Data are given as an arithmetic mean±standard deviation. Mann-Whitney U test was performed with GraphPad PRISM version 7 (La Jolla, CA, USA). Values of *$p<0.05$, $p<0.01$ and *$p<0.001$ were considered significant and are indicated in the figures.

Results

ITIH5 Stabilizes ECM Structures and Regulates Biological Processes in Murine Skin Models TSG6, a member of the ITIH family, has previously been postulated to cross-link hyaluranic acid (Zhuo et al., 2004, supra). It was the aim of the inventors to assess the impact of ITIH5 on ECM structures using 3D skin models containing dermal fibroblasts and epidermal keratinocytes from either Itih5$^{-/-}$ or WT mice. To visualize ECM structures in these skin models, they used van Gieson's stain and a biotinylated hyaluronan binding protein (bHABP) (FIG. 1A-1H). While skin models employing WT cells showed a pronounced fibril-like pattern (FIG. 1A to F), skin models of Itih5$^{-/-}$ mice showed a diffuse pattern of ECM structures (FIG. 1E to H).

To assess the biological relevance of ITIH5 in skin, a transcriptomic microarray profiling of the murine skin models was also performed (FIG. 1B). Strong upregulation of genes associated with tissue remodelling and wound healing was observed (i.e. Car4, Postn, Mmp19, Mmp10, Mmp9 and Mmp3) as well as a down-regulation of differentiation markers including members of the late cornified envelope (LCE) protein family (Lce3a), Lce3b, Lce3c, Lce3f, Lce1b, Lce1e and Lce1e), loricrin, keratin 10, keratin 13 and keratin 23 as well as repetin (Rptn) and arachidonate 12-lipoxygenase (Alox12b). In addition, RT-PCR analyses confirmed the array results for selected genes (FIG. 1C). Gene ontology (GO) analysis revealed an impact of ITIH5 on biological processes (BP) (FIG. 6) such as "epidermis development". "extracellular matrix organization" and "glycosaminoglycan metabolic process".

These data demonstrate a stabilizing effect of ITIH5 on ECM structures and provide a first insight into the molecular function of ITIH5 in the regulation of skin formation and ECM homeostasis.

Recombinant Itih5 Protein can Protect HMW-HA from ROS-Mediated Degradation

Pro-inflammatory LMW hyaluronic acid fragments can be produced by oxidative degradation of HMW hyaluronic acid with reactive oxygen species (ROS) (Esser et al., 2012, supra). In this context, previous studies postulated an ECM-stabilizing effect for ITI heavy chains by cross-linking hyaluronic acid, which is considered as a protective mechanism in inflammation (Chen, L, et al, J Biol Chem (1994) 269, 28282-28287; Day, A. J., and de la Motte, C. A., Trends Immunol (2005) 26, 637-643; Zhuo et al., 2004, supra; Zhuo, L., and Kimata, K., Connect Tissue Res (2008) 49, 311-320).

Figure 2:
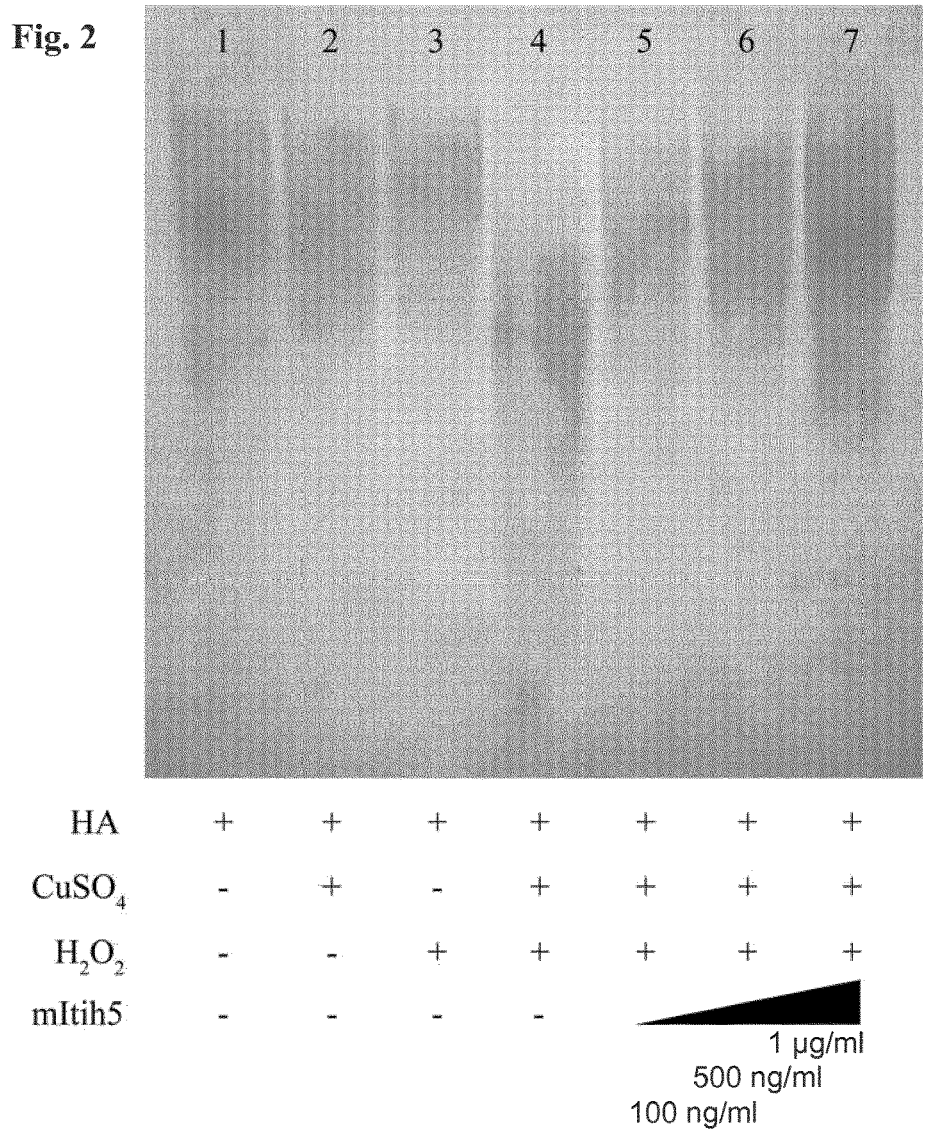
FIG. 2 shows that ITIH5 inhibits hyaluronic acid degradation by ROS in vitro. A stabilizing/protecting effect of ITIH5 on hyaluronic acid was investigated by performing a hyaluronic acid degradation assay using a $CuSO_4/H_2O_2$ system to generate ROS capable of degrading hyaluronic acid. The untreated control of the hyaluronic acid sodium salt is depicted in lane 1, hyaluronic acid sodium salt controls treated with only $CuSO_4$ or with only $H_2O_2$ in lanes 2 and 3. While ROS degraded the hyaluronic acid salt (trace 4), different concentrations of Itih5 inhibited the degradation of hyaluronic acid (lanes 5-7). One representative gel out of three is shown. The molecular weight of hyaluronic acid after incubation was analysed by SDS gel electrophoresis and staining with "Stains all".

In order to test whether a recombinant Itih5 protein is capable of protecting hyaluronic acid from ROS-mediated degradation, a $Cu(II)SO_4/H_2O_2$ system producing ROS was used as described previously (Esser et al., 2012, supra; Gao et al., J Biol Chem (2008) 283, 6058-6066). FIG. 2 shows the sodium salt of HMW hyaluronic acid (lanes 1-3) and its degradation by ROS to the sodium salts of LMW hyaluronic acid fragments (lane 4). A murine recombinant Itih5 protein was able to inhibit the degradation of HMW hyaluronic acid in a dose-dependent manner (lanes 5-7). These results show the ability of ITIH5 to stabilize hyaluronic acid by preventing oxidative hyaluronic acid degradation.

ITIH5 Expression Impairs Adhesion of NHDFs to Hyaluronic Acid

Figure 3A:
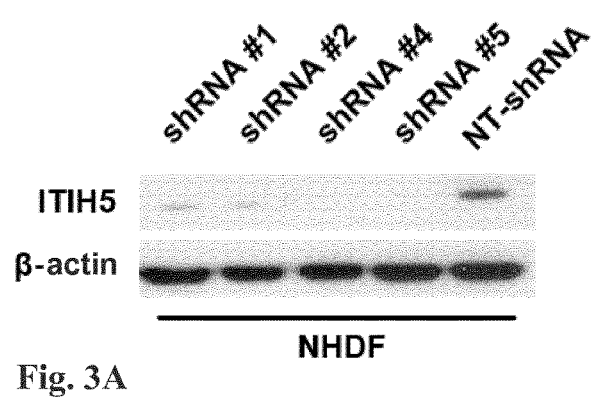
FIGS. 3A and B show ITIH5 protein expression (FIG. 3A: Western blot.
Figure 3B:
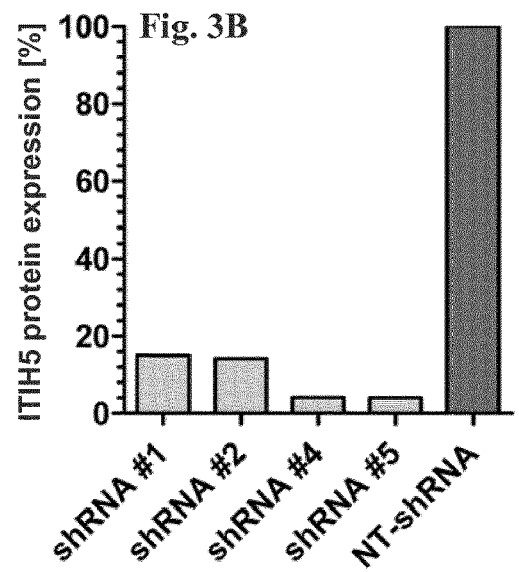
FIG. 3B: densitometric analysis) in ITIH5-shRNA knockdown clones and NT-shRNA control. β-Actin served as a load control.
Figure 3C:
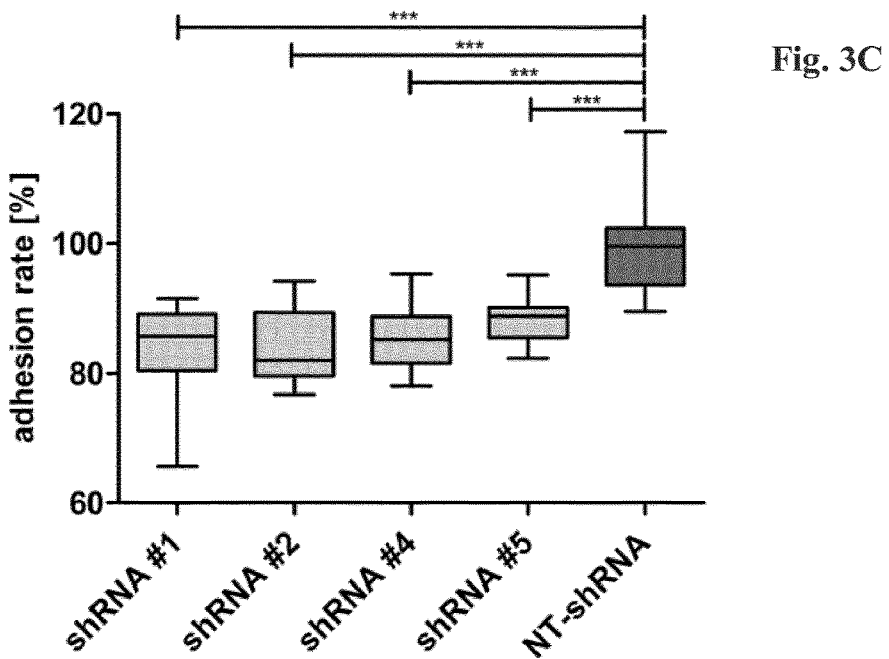
FIG. 3C shows the cell-matrix adhesion of ITIH5-shRNA knockdown clones and NT-shRNA control on the hyaluronic acid/hyaluronan substrate. The bar representation in FIG. 3C represents the average of three independent experiments. ***$p<0.001$.

In their previous study, the inventors found that normal human dermal fibroblasts (NHDFs) are the main expression site of ITIH5 in human skin (Huth et al., 2015, supra). To further investigate the role of ITIH5 in skin, NHDFs were generated with a stable shRNA-mediated knockdown of ITIH5, which was confirmed at the protein and mRNA levels (FIGS. 3A and 3B). Experimentally, stable ITIH5-shRNA-expressing NHDF cells showed altered cell-matrix adhesion dynamics in vitro. Using hyaluronic acid as a substrate to imitate the ECM, knockdown of ITIH5 led to a significantly decreased cell-matrix adhesion compared to control cells (FIG. 3C).

ITIH5 Modulates Inflammatory Reactions in Allergic Contact Dermatitis

Figure 4A:
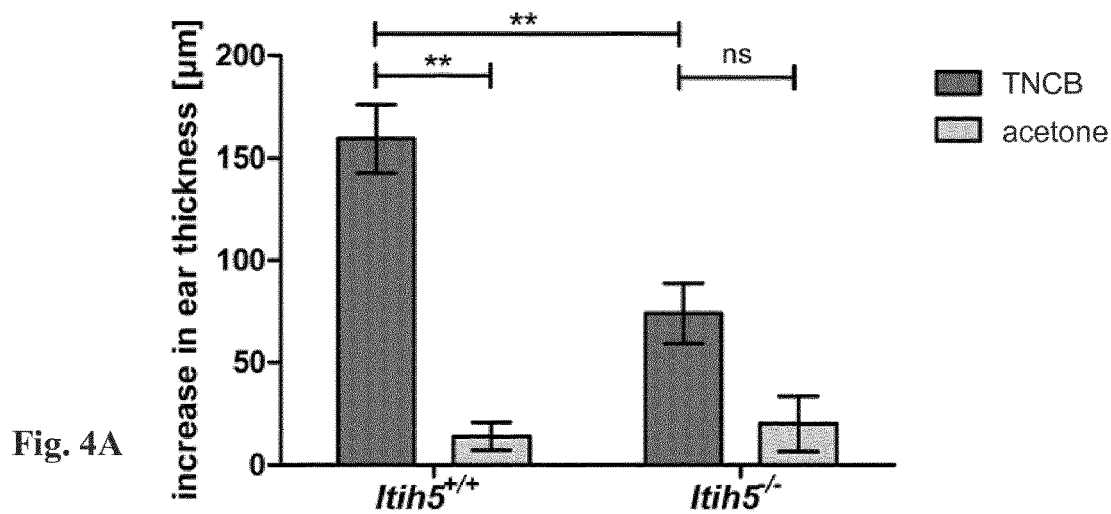
FIG. 4A: Itih5$^{+/+}$ and Itih5$^{-/-}$ mice were sensitized with TNCB (3%) or acetone as a solvent control and challenged with TNCB (1%) 5 days later. Itih5$^{-/-}$ mice exhibited no ear swelling. The data show a mean increase in car thickness±standard deviation with n=5 mice/group, **$p<0.01$.
Figure 4B:
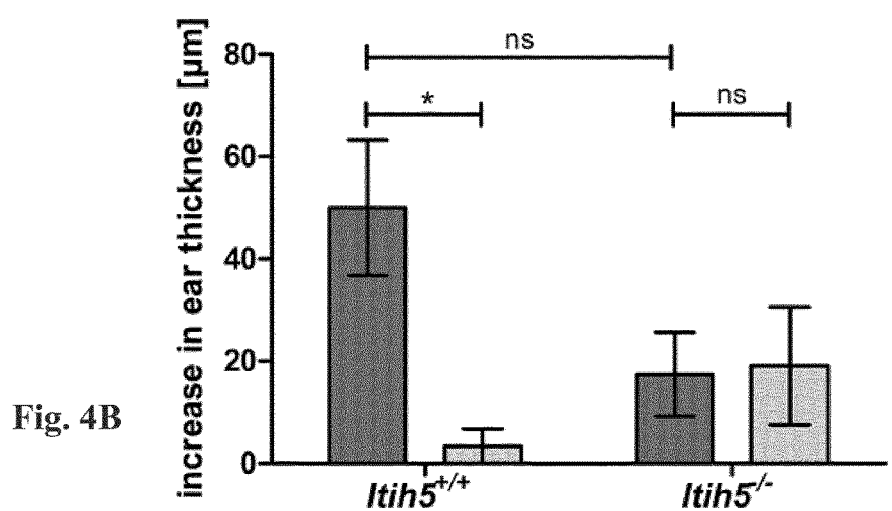
FIG. 4B: Lymph node cells isolated from TNCB-sensitized Itih5$^{-/-}$ donor mice were adoptively transferred to WT recipient mice. The data show a mean increase in ear thickness±standard deviation with n=3 mice per group, *$p<0.05$, ns=not significant.

Previously, the inventors showed that ITIH5 is significantly upregulated in allergic contact dermatitis (ACD) (Huth et al., 2015, supra). To better understand the role of ITIH5 in ACD, the CHS mouse model was used, where the intensity of the ear swelling reaction is used as a measure of the inflammatory response. The studies showed that $Itih5^{-/-}$ mice displayed significantly decreased ear swelling reactions after 2,4,6-trinitrochlorobenzene (TNCB) application, in comparison to WT controls (n=5) (FIG. 4A). These data indicate that ITIH5 is indispensable for CHS responses, without specifically distinguishing between sensitisation and excitation phases. Therefore, adoptive CHS (trans-sensitization or passive CHS) experiments were conducted to further investigate the role of ITIH5 in sensitization (FIG. 4B). The available results showed that no TNCB induced ear swelling response could be observed when lymph node cells isolated from TNCB-sensitized $Itih5^{-/-}$ donor mice were adoptively transferred to WT receptor mice, compared to vehicle controls (n=3). These results provide evidence for a functional role of ITIH5 in the sensitisation phase of CHS.

Effect of ITIH5 on Epidermis Thickness

If a solution of the recombinant ITIH5 protein was injected into a human 3D skin model, an increase in epidermis thickness was observed (FIG. 5A-C).

Effect of ITIH5 on Gene Expression

The injection of ITIH5 into human skin models showed similar effects on gene expression as observed with the injection of a hyaluronic acid preparation (FIG. 7). In particular, the analysis showed upregulation of genes associated with tissue remodeling and immune response (TIMP3, MMP3, CCL20, CXCLs) as well as downregulation of differentiation markers (e.g. FLG, LOR, IVL) and proinflammatory cytokines (IL36G, IL36RN, IL36B). These data indicate an increased proliferation of epidermal cells.

DISCUSSION

Hyaluronic acid is a major component of the ECM and plays an important role in the metabolisms of the skin where the bulk of hyaluronic acid is produced and deposited (Kavasi, R. M. et al., Food and Chemical Toxicology: an international journal published for the British Industrial Biological Research Association (2017) 101, 128-138; Keen, M. A., Skinmed (2017) 15, 441-448). Properties of hyaluronic acid are dependent on the molecular weight thereof. In this context, degradation of HA leads to biologically active oligosaccharides that are associated with inflammatory skin diseases (Esser, P R, et al., PLoS One (2012) 7, e41340; Kavasi et al., 2017, supra). Mounting evidence suggests that binding to hyaladherins can organize hyaluronic acid in into a wide variety of molecular architectures, providing different properties such as stabilization of the ECM or anti-inflammatory effects (Day and de la Motte, 2005, supra). The inventors have already shown that ITIH5 represents the main ITIH family member expressed in human skin, whereas ITIH1-4 are hardly expressed (Huth et al., 2015, supra). Previous studies have shown that ITIH1-3 can form covalent ester bonds with hyaluronic acid, yielding ITIH-hyaluronic acid complexes that may stabilize the ECM by cross-linking hyaluronic acid (Sanggaard, K. W., et al., J Biol Chem (2008) 283, 18530-18537; Zhao, M., et al., J Biol Chem (1995) 270, 26657-26663; Zhuo et al., 2004, supra). Although the existence of a stabilizing interaction between ITIH5 and the ECM component hyaluronic acid has not yet been proven in detail, ITIH5 features all of the structural characteristics of ITIH1-3 that are necessary for hyaluronic acid complexation (Himmelfarb, M. et al., Cancer Lett (2004) 204, 69-77).

In the current study skin models of $Itih5^{-/-}$ mice exhibited a diffuse pattern of ECM structures in comparison to controls. This phenotypic abnormality suggests an Itih5 mediated hyaluronic acid cross-linking, which is essential for stabilizing the ECM as previously described for ITIH1-3 (Zhu, L., et al., Connect Tissue Res (2008) 49, 48-55). Providing further evidence for an interaction between ITIH5 and hyaluronic acid, the inventors have demonstrated that fibroblasts with a shRNA-mediated knockdown of ITIH5 exhibit a diminished adhesion to hyaluronic acid. These observations are in line with findings by Zhuo et al. (Zhuo, L., et al., J Biol Chem (2006) 281, 20303-20314) who showed that ITIHs potentiate the adhesion of CD44-positive cells to hyaluronic acid. In this context, a recent study showed that CD44 influences fibroblast behaviour via modulating cell-matrix interactions (Tsuneki, M., and Madri, J. A., J Cell Physiol (2016) 231, 731-743).

Based on this knowledge, it is likely that the reduced adhesion of ITIH5 knockdown fibroblasts to hyaluronic acid observed by the inventors is due to an impaired CD44-hyaluronic acid connection. However, these findings support a recent study suggesting that ITIH5-hyaluronic acid interaction via CD44 on the one hand triggers phenotypic changes in fibroblasts and on the other hand conditions the formation of a pericellular pericellular hyaluronic acid matrix (Martin, J, et al., J Biol Chem (2016) 291, 13789-13801).

The ITIH1-3-mediated cross-linking of hyaluronic acid was previously suggested as a protective mechanism against the degradation of hyaluronic acid in inflammatory processes (Day and de la Motte, 2005, supra), since ITIH-hyaluronic acid complexes were identified in synovial fluids from arthritis patients (Yingsung, W., et al., J Biol Chem (2003) 278, 32710-2718).

A ROS-mediated degradation assay provides the first evidence that ITIH5 is capable of protecting hyaluronic acid from degradation. In this regard, a previous study by the inventors showed that ITIH5 is significantly upregulated in inflammatory skin diseases (Huth et al., 2015, supra). This upregulation could be a compensatory mechanism to stabilize hyaluronic acid thereby preventing the accumulation of inflammatory LMW-HA, and possibly facilitating immune responses.

To further elucidate the biological function of ITIH5 in the skin, the inventors subjected skin equivalents of Itih5$^{-/-}$ mice to gene microarray and RT-PCR analysis. The findings showed an upregulated expression level of genes (e.g. Car4 and Postn) that are associated with wound healing and tissue remodeling in Itih5$^{-/-}$ skin models. While carbonic anhydrase 4 (Car4) promotes tissue regeneration and accelerates wound healing (Barker, H., et al., Experimental & Molecular Medicine (2017) 49, e334), previous studies have shown that periostin (Postn) is prominently expressed during ECM remodelling (Zhou, L. et al., J Biol Chem (2010) 279, 38079-38082). Furthermore, the inventors detected an increased expression of various matrix metalloproteinases (MMPs) in murine skin models lacking Itih5. MMPs are the main ECM enzymes responsible for the degradation of essentially all ECM components (Jablonska-Trypuc, A., et al., Journal of Enzymes Inhibition and Medicinal Chemistry (2016) 31, 177-183; Kähäri, V. M., and Saarialho-Kere, U., Exp Dermatol (1997) 6, 199-213). Interestingly, several studies have shown that HMW-HA is able to suppress the expression of different MMPs (Pohlig, F., et al., PLoS One (2016) 11, e0150020; Shimizu, M., et al., J Rheumatol (2003) 30, 1164-1172; Takahashi, K., et al., Osteoarthritis and Cartilage (1999) 7, 182-190). The lack of Itih5 was further associated with the down-regulation of genes encoding epidermal differentiation. Overall, these gene regulations fit to the phenotypic anomalies observed with respect to diffuse ECM patterns and epidermal disorders in Itih5$^{-/-}$ skin models. In agreement with the detected gene regulations, the inventors found an impact of ITIH5 on biological processes such as "epidermis development", "extracellular matrix organization" and "glycosaminoglycan metabolic process". Together, the expression data support and emphasize the functional relevance of ITIH5 in biological skin processes such as ECM organization, skin homeostasis and epidermal differentiation.

In their previous studies, the inventors have shown that ITIH5 is significantly upregulated in ACD (Huth et al., 2015, supra). Using the CHS model, where a role for HA degradation in modulating the inflammatory response has been recently described (Esser, P. R., et al., PLoS One (2012) 7, e41340), the inventors detected that Itih54-mice showed significantly reduced CHS responses. These results were not in accordance with the first assumption that ITIH5 as a hyaluronic acid stabilizer prevents hyaluronic acid degradation and consequently CHS responses. In this case, Itih5$^{-/-}$ mice should show more pronounced CHS responses than controls. The inventors speculate that the previously postulated ITIH-dependent CD44-HA interaction could be an explanation for their observations. The hyaluronic acid receptor CD44 is required for a full inflammatory response to hyaluronic acid fragments in vitro (Taylor, K. R. et al., J Biol Chem (2007) 282, 18265-18275) and and is necessary for optimal contact allergy responses due to leukocyte extravasation into inflammatory sites (Camp, R. L., et al., J Exp Med (1993) 178, 497-507). Previous studies have shown that ITIH1-3 potentiate the CD44-mediated leukocyte adhesion to HA and thereby leukocyte migration to inflammatory sites where hyaluronic acid is accumulated (Lauer, M. E., et al., J Biol Chem (2013) 288, 423-431; Zhuo et al., 2006, supra). Without Itih5 as the major heavy chain in skin, CD44-mediated leukocyte recruitment in the sensitized Itih5$^{-/-}$ mice may be could be less, thereby reducing CHS responses. In this context, Muto and colleagues demonstrated that HA degradation in HYAL1 overexpressing mice decreases CHS response due to the depletion of dendritic cells (DCs) from the skin (Muto, J., et al., J Clin Invest (2014) 124, 1309-1319). Since DCs express CD44, the authors assume that the loss of hyaluronic acid from the ECM alters CHS responses via missing interactions between CD44 and HA in leukocyte trafficking. Overall, the available data suggest that ITIH5 may be a novel key player in inflammatory responses of the skin. The detailed impact of ITIH5 in the sensitisation phase of CHS needs to be elucidated in further studies.

The injection of ITIH5 into human skin models shows similar effects on epidermis thickness and gene expression patterns compared to hyaluronic acid. These observations suggest that ITIH5 is able to support naturally occurring hyaluronic acid in the skin.

In summary, these data provide the first evidence that ITIH5 interacts with hyaluronic acid thereby on the one hand triggering biological processes in skin including ECM stabilization and epidermal differentiation and on the other hand modulating CHS-associated inflammatory responses. The available results offer new therapeutic options for experiencing epidermal dysfunction and hyaluronic acid-based aging-related skin changes, such as wrinkles and epidermal thinning, where ITIH5 as a stabilizer of hyaluronic acid can counteract these disorders.

The invention claimed is:

1. A composition comprising a mature human ITIH5 full-length protein, water, at least one of a local anesthetic, a salt or an ester of hyaluronic acid and at least one of a cosmetically or a pharmaceutically acceptable excipient.

2. The composition according to claim 1, wherein the mature human ITIH5 full-length protein has a consecutive sequence that is at least 99% identical to the consecutive sequence of amino acid positions 17 to 942 of the sequence of isoform 1 of Swissprot/Uniprot accession number Q86UX2-1, version 2 of the sequence.

3. The composition according to claim 1, comprising 0.1 to 25% (w/w) of the mature human ITIH5 full-length protein.

4. The composition according to claim 1, comprising a salt or an ester of hyaluronic acid, wherein the hyaluronic acid has an average molecular weight of about 600 kilodaltons or more.

5. The composition according to claim 1, wherein the composition comprises 0.05 to 20% by weight of a salt or an ester of hyaluronic acid, based on the total weight of the composition.

6. A method for at least one of (a) alleviating at least one of skin aging, wrinkled skin, rough skin, dry and rough skin, acne, acne scar, skin atrophy or pressure ulcer (decubitus), (b) treating at least one of an arthritic joint, an arthrotic joint, an arthritic and arthrotic joint or an arthrotic alteration of a joint, or (c) treating a subject suffering from reduced levels of hyaluronic acid, the method comprising administering a composition comprising a mature human ITIH5 full-length protein, water, at least one of a local anesthetic, a salt or an ester of hyaluronic acid and at least one of a cosmetically or a pharmaceutically acceptable excipient onto a biological keratinic structure of the subject, into a biological keratinic structure of the subject, or a combination thereof.

7. The method of claim 1, wherein the mature human ITIH5 full-length protein has a consecutive sequence that is at least 99% identical to the consecutive sequence of amino acid positions 17 to 942 of the sequence of isoform 1 of Swissprot/Uniprot accession number Q86UX2-1, version 2 of the sequence.

8. The method according to claim 1, being a method for alleviating at least one of skin aging, wrinkled skin, rough skin, dry and rough skin, acne, acne scar, skin atrophy or pressure ulcer, the method comprising administering the composition comprising a mature human ITIH5 full-length protein, water, at least one of a local anesthetic, a salt or an ester of hyaluronic acid and at least one of a cosmetically or a pharmaceutically acceptable excipient onto the skin of a subject, into the skin of a subject or a combination thereof, or into a joint of a subject.

9. The method according to claim 1, being a method for treating at least one of an arthritic joint, an arthrotic joint, an arthritic and arthrotic joint or an arthrotic alteration of a joint, the method comprising administering the composition comprising a mature human ITIH5 full-length protein, water, at least one of a local anesthetic, a salt or an ester of hyaluronic acid and at least one of a cosmetically or a pharmaceutically acceptable excipient into a joint of a subject.

10. The method according to claim 1, being a method for alleviating at least one of skin aging, wrinkled skin, rough skin, dry and rough skin, acne, acne scar, skin atrophy or pressure ulcer, wherein the subject suffers from reduced levels of hyaluronic acid.

11. The method according to claim 1, being a method for treating at least one of an arthritic joint, an arthrotic joint, an arthritic and arthrotic joint or an arthrotic alteration of a joint, wherein the subject suffers from reduced levels of hyaluronic acid.

12. A method for cosmetically treating the skin of a subject, comprising applying a composition comprising a mature human ITIH5 full-length protein, water, at least one of a local anesthetic, a salt or an ester of hyaluronic acid and at least one of a cosmetically or a pharmaceutically acceptable excipient onto or into the skin of the subject.

13. The method according to claim 12, wherein the subject suffers from a reduction of hyaluronic acid.

14. The method according to claim 12, wherein the mature human ITIH5 full-length protein has a consecutive sequence that is at least 99% identical to the consecutive sequence of amino acid positions 17 to 942 of the sequence of isoform 1 of Swissprot/Uniprot accession number Q86UX2-1, version 2 of the sequence.

\* \* \* \* \*